(12) United States Patent
Lewander et al.

(10) Patent No.: US 12,537,690 B2
(45) Date of Patent: **\*Jan. 27, 2026**

(54) DATA PROTECTION ON DISTRIBUTED DATA STORAGE (DDS) PROTECTION NETWORKS

(71) Applicants: Philip Lewander, Fox Point, WI (US); Cameron Jungers, River Hills, WI (US)

(72) Inventors: Philip Lewander, Fox Point, WI (US); Cameron Jungers, River Hills, WI (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/096,557

(22) Filed: Mar. 31, 2025

(65) Prior Publication Data

US 2025/0254047 A1    Aug. 7, 2025

Related U.S. Application Data

(63) Continuation of application No. 18/751,150, filed on Jun. 21, 2024, now Pat. No. 12,267,436, which is a continuation of application No. 17/849,461, filed on Jun. 24, 2022, now Pat. No. 12,058,270.

(60) Provisional application No. 63/331,173, filed on Apr. 14, 2022.

(51) Int. Cl.
*H04L 9/32* (2006.01)
*H04L 9/08* (2006.01)
*H04L 9/14* (2006.01)
*H04L 67/1097* (2022.01)

(52) U.S. Cl.
CPC .......... *H04L 9/3236* (2013.01); *H04L 9/0825* (2013.01); *H04L 9/14* (2013.01); *H04L 9/3247* (2013.01); *H04L 67/1097* (2013.01)

(58) Field of Classification Search
CPC ....... H04L 9/3236; H04L 9/0825; H04L 9/14; H04L 9/3247; H04L 67/1097
See application file for complete search history.

(56) References Cited

U.S. PATENT DOCUMENTS

| | | | |
|---|---|---|---|
| 2014/0379836 A1\* | 12/2014 | Zilberboim | G06F 11/1076 709/213 |
| 2019/0238525 A1 | 8/2019 | Padmanabhan et al. | |
| 2020/0128024 A1\* | 4/2020 | Kuramkote | H04L 41/0816 |
| 2020/0162236 A1\* | 5/2020 | Miller | G06F 40/174 |
| 2020/0371487 A1\* | 11/2020 | Boelderl-Ermel | H04L 9/3247 |
| 2020/0380091 A1\* | 12/2020 | Bansal | G06F 21/10 |

(Continued)

OTHER PUBLICATIONS

International Search Report and Written Opinion on PCT/US2023/018688 dated Jul. 10, 2023.

(Continued)

*Primary Examiner* — Yonas A Bayou
(74) *Attorney, Agent, or Firm* — Foley & Lardner LLP

(57) ABSTRACT

Systems, methods, and computer-readable storage media of data protection on a distributed data storage (DDS) protection network using a distribution protocol. Some methods include identifying, by one or more processing circuits, a request associated with a digital asset. Some methods further include generating, by the one or more processing circuits, a new data object associated with the request. Some methods further include updating, by the one or more processing circuits, a network ledger to comprise the new data object.

20 Claims, 18 Drawing Sheets

(56) References Cited

U.S. PATENT DOCUMENTS

| | | | | |
|---|---|---|---|---|
| 2020/0389495 A1* | 12/2020 | Crabtree | ............... | G06F 16/951 |
| 2020/0403805 A1 | 12/2020 | Steele et al. | | |
| 2020/0409558 A1* | 12/2020 | Dance | ................... | G06F 3/0653 |
| 2021/0230974 A1* | 7/2021 | Frost | ....................... | E21B 43/35 |
| 2022/0029932 A1* | 1/2022 | Pattyreddy | ............. | G06N 20/00 |
| 2022/0318907 A1* | 10/2022 | Bleznak | ............... | G06Q 20/065 |
| 2022/0329628 A1 | 10/2022 | Zayats et al. | | |
| 2023/0246817 A1* | 8/2023 | Everspaugh | .......... | H04L 9/3255 |
| | | | | 713/171 |
| 2023/0246822 A1* | 8/2023 | Everspaugh | .............. | H04L 9/50 |
| | | | | 713/153 |
| 2023/0246850 A1* | 8/2023 | Everspaugh | .............. | H04L 9/50 |
| | | | | 713/180 |

OTHER PUBLICATIONS

Preliminary International Search Report on PCT PCT/US2023/018688 Dtd Oct. 24, 2024.

\* cited by examiner

| Code | Description |
|---|---|
| 00 | Initiation of announcement transmission. |
| 01 | Acceptance of announcement transmission, contains CP server info to transmit new ledger data. |
| 02 | Module search information request. |
| 03 | Module search response, contains routing information for the module being searched for. |
| 04 | Module request. |
| 05 | Module request response to complete transmission of module, includes CP server information to transmit module. |
| 06 | Module request response that the node does not have the module requested. |
| 07 | Module swap request. |
| 08 | Module swap request acceptance. |
| 10 | CP transmission of new ledger data for an announcement. |
| 11 | CP transmission of the module requested in a module request. |

FIG. 3

DATA PROTECTION ON DISTRIBUTED DATA STORAGE (DDS) PROTECTION NETWORKS

CROSS-REFERENCE TO RELATED PATENT APPLICATIONS

This application is a continuation application of U.S. patent application Ser. No. 18/751,150 filed Jun. 21, 2024, titled "Data Protection on Distributed Data Storage (DDS) Protection Networks," which is a continuation application of U.S. patent application Ser. No. 17/849,461, filed Jun. 24, 2022, titled "Data Protection on Distributed Data Storage (DDS) Protection Networks," which claims the benefit of U.S. Provisional Application No. 63/331,173, filed Apr. 14, 2022, titled "Access Control Management in Distributed File Storage," which are incorporated herein by reference in their entireties.

BACKGROUND

The present disclosure relates generally to the field of data protection, and in particular, to storing information from data sources such as files on distributed data storage networks.

SUMMARY

Some arrangements relate to a computer-implemented method of data protection on a distributed data storage (DDS) protection network using a distribution protocol. The computer-implemented method includes receiving, by at least one of a plurality of DDS protection network nodes, a digital asset and a public key of an owner of the digital asset, wherein the digital asset includes a dataset. Further, the method includes generating, by the at least one of the plurality of DDS protection network nodes, a plurality of component files and a data protection object based on the dataset. Further, the method includes storing, by the at least one of the plurality of DDS protection network nodes, at least one of the plurality of component files on a first DDS protection network node of the plurality of DDS protection network nodes, wherein the first DDS protection network node stores a first data payload including at least a first signature and a first public key. Further, the method includes storing, by the at least one of the plurality of DDS protection network nodes, at least one of the plurality of component files on a second DDS protection network node of the plurality of DDS protection network nodes, and wherein the second DDS protection network node stores a second data payload including at least a second signature and a second public key. Further, the method includes configuring, by the at least one of the plurality of DDS protection network nodes, the data protection object in a first block on a DDS protection network ledger. Further, the method includes receiving, by the at least one of the plurality of DDS protection network nodes, a request associated with the digital asset. Further, the method includes generating, by the at least one of the plurality of DDS protection network nodes, a new data protection object associated with the request. Further, the method includes updating, by the at least one of the plurality of DDS protection network nodes, the DDS protection network ledger to include the new data protection object, wherein updating includes generating a second block including at least the new data protection object, creating a sub-chain within the DDS protection network ledger, wherein the sub-chain includes at least one retroactive data protection object traceable to the new data protection object, and updating a present state of the DDS protection network ledger.

In some arrangements, the plurality of DDS protection network nodes further execute a component file swap between at least two nodes of the plurality of DDS protection network nodes, wherein the component file swap includes transmitting, by a third DDS protection network node to a fourth DDS protection network node, a third data payload including a third signature and a third public key, receiving, by the third DDS protection network node from the fourth DDS protection network node, a fourth data payload including a fourth signature and a fourth public key, requesting, by the third DDS protection network node from the fourth DDS protection network node, a first component file, and receiving, by the third DDS protection network node from the fourth DDS protection network node, a fifth data payload including a fifth signature and a fifth public key associated with the first component file.

In various arrangements, the plurality of DDS protection network nodes further execute a component file request between at least two nodes of the plurality of DDS protection network nodes, wherein the component file request includes transmitting, by a third DDS protection network node to a fourth DDS protection network node, a third data payload including a third signature, a third public key, and an ID hash for a first component file, receiving, by the third DDS protection network node from the fourth DDS protection network node, a fourth data payload including a fourth signature, a fourth public key, and the ID hash for the first component file, establishing, by the third DDS protection network node utilizing a transmission control protocol (TCP) handshake, a TCP connection with the fourth DDS protection network node, receiving, by the third DDS protection network node from the fourth DDS protection network node via the TCP connection, the first component file, and storing, by the third DDS protection network node, the first component file.

In some arrangements, the method further includes searching, by the at least one of the plurality of DDS protection network nodes, the DDS protection network ledger for the data protection object associated with the digital asset, decrypting, by the at least one of the plurality of DDS protection network nodes, the data protection object, executing, by the at least one of the plurality of DDS protection network nodes, a search routine for each of the plurality of component files, reconstructing, by the at least one of the plurality of DDS protection network nodes, the digital asset based on interpretating the plurality of component files based on the data protection object, and transmitting, by the at least one of the plurality of DDS protection network nodes, the digital asset to a user device.

In various arrangements, generating the data protection object further includes generating, by the at least one of the plurality of DDS protection network nodes, a plurality of data protection object metadata for the data protection object, and storing, by the at least one of the plurality of DDS protection network nodes, the plurality of data protection object metadata into the data protection object.

In some arrangements the request is at least one of an exchange request, a transfer request, an update request, or an access request.

In various arrangements, generating the plurality of component files includes creating, by the at least one of the plurality of DDS protection network nodes, a plurality of encrypted digital assets based on encrypting each of a plurality of split digital assets of the digital asset.

In some arrangements, splitting includes creating a plurality of data subsets of the dataset, and wherein the dataset is a first file size, and wherein each of the plurality of data subsets is a second file size with a buffer, and wherein the second file size without the buffer is equal to the first file size of the dataset.

In various arrangements, creating the plurality of encrypted digital assets further includes modifying each of the plurality of split digital assets, wherein modifying includes adding a plurality of encrypted digital asset metadata fields to the plurality of split digital assets.

In some arrangements, creating the plurality of encrypted digital assets based on encrypting each of the plurality of split digital assets further includes creating, by the at least one of the plurality of DDS protection network nodes, the plurality of split digital assets based on splitting the digital asset, generating, by the at least one of the plurality of DDS protection network nodes, a plurality of split digital asset metadata for each of the plurality of split digital assets, and storing, by the at least one of the plurality of DDS protection network nodes, the plurality of split digital asset metadata into a corresponding split digital asset.

In various arrangements, updating the DDS protection network ledger is further based on receiving a predetermined number of requests, and wherein updating the DDS protection network ledger to include the new data protection object further including updating the DDS protection network ledger to include additional data protection objects associated with the predetermined number of requests.

In some arrangements, storing the data protection object on the DDS protection network ledger further includes generating the first block including the data protection object.

In various arrangements, the data protection object is the at least one retroactive data protection object in response to updating the DDS protection network ledger to include the new data protection object.

In some arrangements, the at least one retroactive data protection object is traceable to the new data protection object based on each of a plurality of data protection objects in the sub-chain referencing a next data protection object and a previous data protection object, and wherein the new data protection object is associated with the present state.

Some arrangements relate to a system with at least one processing circuit having at least one processor coupled to at least one memory. The at least one processing circuit can be configured to receive a digital asset and a public key of an owner of the digital asset, wherein the digital asset includes a dataset. Further, the at least one processing circuit can be configured to generate a plurality of component files and a data protection object based on the dataset. Further, the at least one processing circuit can be configured to store at least one of the plurality of component files on a first DDS protection network node of the plurality of DDS protection network nodes, wherein the first DDS protection network node stores a first data payload including at least a first signature and a first public key. Further, the at least one processing circuit can be configured to store at least one of the plurality of component files on a second DDS protection network node of the plurality of DDS protection network nodes, and wherein the second DDS protection network node stores a second data payload including at least a second signature and a second public key. Further, the at least one processing circuit can be configured to configure the data protection object in a first block on a DDS protection network ledger. Further, the at least one processing circuit can be configured to receive a request associated with the digital asset. Further, the at least one processing circuit can be configured to generate a new data protection object associated with the request. Further, the at least one processing circuit can be configured to update the DDS protection network ledger to include the new data protection object, wherein updating includes generating a second block including at least the new data protection object, creating a sub-chain within the DDS protection network ledger, wherein the sub-chain includes at least one retroactive data protection object traceable to the new data protection object, and updating a present state of the DDS protection network ledger.

In some arrangements, wherein the at least one processing circuit is further configured to search the DDS protection network ledger for the data protection object associated with the digital asset, decrypt the data protection object, execute a search routine for each of the plurality of component files, reconstruct the digital asset based on interpretating the plurality of component files based on the data protection object, and transmit the digital asset to a user device.

In various arrangements, updating the DDS protection network ledger is further based on receiving a predetermined number of requests, and wherein updating the DDS protection network ledger to include the new data protection object further including updating the DDS protection network ledger to include additional data protection objects associated with the predetermined number of requests.

In some arrangements, the data protection object is the at least one retroactive data protection object in response to updating the DDS protection network ledger to include the new data protection object.

In some arrangements, the at least one retroactive data protection object is traceable to the new data protection object based on each of a plurality of data protection objects in the sub-chain referencing a next data protection object and a previous data protection object, and wherein the new data protection object is associated with the present state.

Some arrangements relate to one or more non-transitory computer-readable storage media having instructions stored thereon that, when executed by a plurality of processing circuits, cause the plurality of processing circuits to receive a digital asset and a public key of an owner of the digital asset, wherein the digital asset includes a dataset. Further, the one or more non-transitory computer-readable storage media having instructions stored thereon that, when executed by at least one processing circuit, cause the at least one processing circuit to generate a plurality of component files and a data protection object based on the dataset. Further, the non-transitory one or more computer-readable storage media having instructions stored thereon that, when executed by at least one processing circuit, cause the at least one processing circuit to store at least one of the plurality of component files on a first DDS protection network node of the plurality of DDS protection network nodes, wherein the first DDS protection network node stores a first data payload including at least a first signature and a first public key. Further, the non-transitory one or more computer-readable storage media having instructions stored thereon that, when executed by at least one processing circuit, cause the at least one processing circuit to store at least one of the plurality of component files on a second DDS protection network node of the plurality of DDS protection network nodes, and wherein the second DDS protection network node stores a second data payload including at least a second signature and a second public key. Further, the non-transitory one or more computer-readable storage media having instructions stored thereon that, when executed by at least one processing circuit, cause the at least one processing circuit to configure the data protection object in a first block on a DDS protection network ledger. Further, the non-transitory one or more computer-readable storage media having instructions stored thereon that, when executed by at least one processing circuit, cause the at least one processing circuit to receive a request associated with the digital asset. Further, the non-transitory one or more computer-readable storage media having instructions stored thereon that, when executed by at least one processing circuit, cause the at least one processing circuit to generate a new data protection object associated with the request. Further, the non-transitory one or more computer-readable storage media having instructions stored thereon that, when executed by at least one processing circuit, cause the at least one processing circuit to update the DDS protection network ledger to include the new data protection object, wherein updating includes generating a second block including at least the new data protection object, creating a sub-chain within the DDS protection network ledger, wherein the sub-chain includes at least one retroactive data protection object traceable to the new data protection object, and updating a present state of the DDS protection network ledger.

BRIEF DESCRIPTION OF THE DRAWINGS

FIG. 3 is an illustration of an example table of message codes, according to some arrangements.

Figure 1:
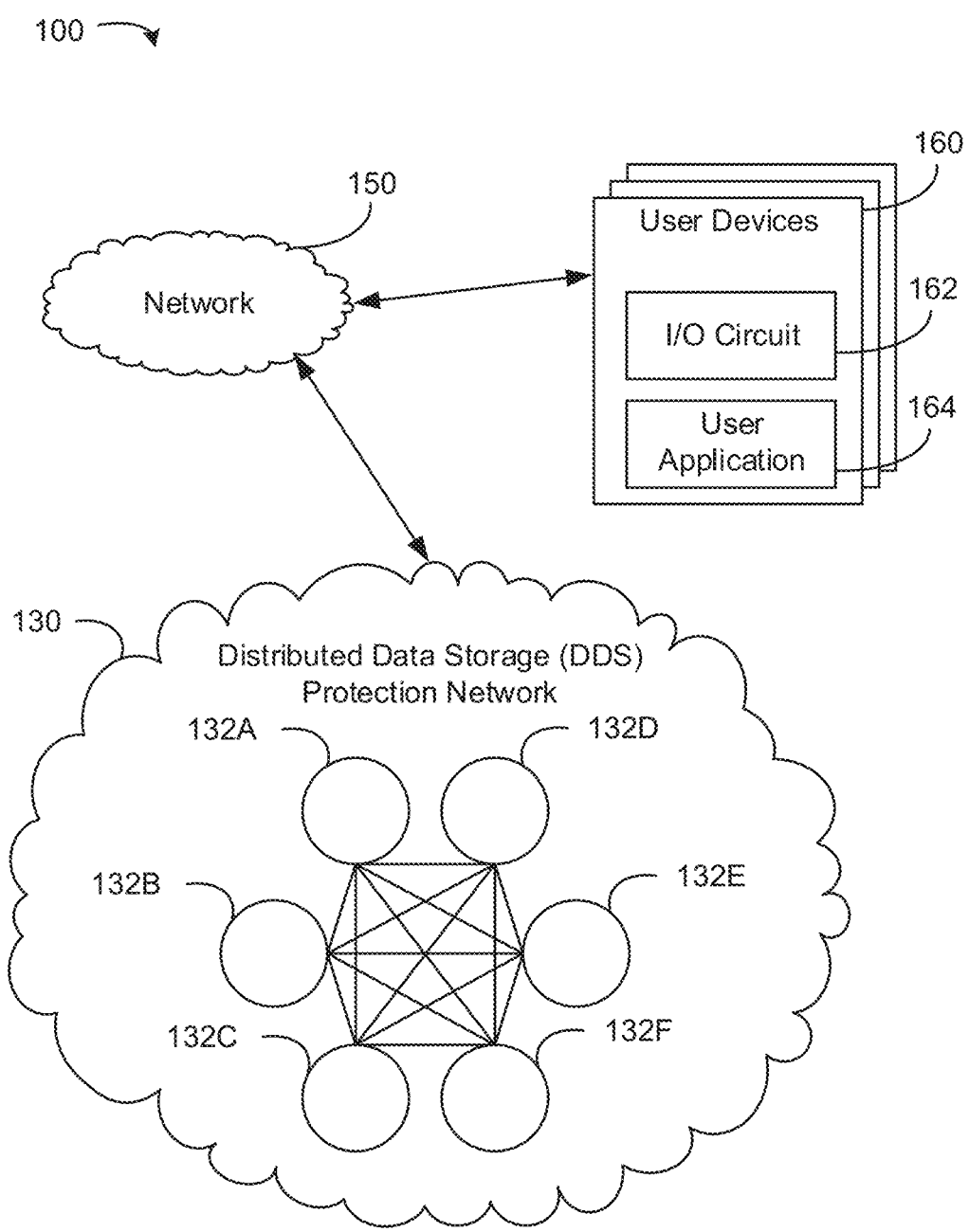
FIG. 1 is a block diagram depicting an example of a data protection system on a distributed data storage (DDS) protection network, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The present disclosure pertains to systems and methods that relate generally to protecting data on distributed data storage protection networks (hereafter referred to "DDS protection network(s)", e.g., blockchains) using distribution models that maintains control, privacy, and security of the underlying data, while allowing distributed file storage, access controls to the distributed files, and transfer of access controls to other nodes on the DDS protection network. In particular, the present disclosure relates to the combination of a distributed peer-to-peer (P2P) file sharing model, a DDS protection network storing records of ownership of files, and the data used to reconstruct and encrypt distributed files. The access controls enables the owner of a given file to decrypt data used in reconstructing a given file, thus allowing the owner to moderate access to the file. In some arrangements, one node can transact or modify ownership of a file and the access controls thereof to another node via the DDS protection networks.

Some arrangements relate to providing distributed file storage, DDS protection network-managed file ownership and access, and moderating access to files. The DDS protection network-managed file ownership and access can include providing and/or executing ownership to other nodes on the DDS protection network, and therefore transferring the moderation of access to the file or files and providing access (e.g., permanent or temporary) to another user through the DDS protection network, which the another can then transfer and execute to other users. In some arrangements, protecting the files including moderating access to files can include enabling the owner to permanently (or temporarily) make a file public (or private) and permanently (or temporarily) provide another user access (e.g., read and write access, view access, transfer access, and so on) to a file. In some arrangements, the DDS protection network architecture disclosed herein improves data security and network technology by eliminating the exposure of data (e.g., sensitive files) over a network and in a computer networked environments, which is a significant improvement over other data protection architectures. The file management and access implemented by the DDS protection network architecture not only protects data from compromise, but also protects entities from exposure, which is a significant improvement to the security of computing systems.

Still referring to the present disclosure generally, the DDS protection network architecture can enable access controls, allow the tracking of access to files and verifying of access to files, secure distribution of files/software (e.g., download clients for video games, word processing software, or other software or games), implement immutable records of file transfers and access (e.g., digital purchase receipts, digital asset marketplaces, and so on). In some arrangements, a DDS protection network allows for exchange or transfer of ownership and access controls to any digital assets hosted on the DDS protection network. For example, digital assets can include, but are not limited to, files (e.g., Computer Aided Design (CAD) files, text file, graphic files, and presentation files), documents, records, images, videos, audio, links, data, public and private keys, and so on. Digital assets can be added to a DDS protection network and can be encrypted before being subdivided (or split) into component files, each component file can include, but is not limited to, an encrypted file (e.g., less than 5%-10% of the overall file size, or same size across the DDS protection network nodes 132 (sometimes with file size padding)), and a Filot (hereafter referred to herein as "a data protection object").

In some arrangements, the encrypted file can store, but is not limited to, an ID hash, a sequence number of the component's bytes, a hash of the data stored in the component file, and a user identifier of bytes from the digital asset encrypted using an encryption key. The ID hash can be generated by executing a hashing function on the timestamp the sequence number and the hash of its data. The sequence number of a component's bytes can be utilized when retrieving and reconstructing the file from the network (e.g., the first set of encrypted bytes has the sequence number one, the second set of encrypted bytes has the sequence number two, and so on). The hash of the data can be used in the future for validation that the component file has not been modified. For example, the encryption key using a cryptographic function could be a homomorphic encryption function, any symmetric encryption function (e.g., Triple Data Encryption Standard (TDES), RC5, Advanced Encryption Standard (AES), Blowfish, CAST, and so on), and/or asymmetric encryption function (e.g., Rivest-Shamir-Adleman (RSA), Efficient and Compact Subgroup Trace Representation (ECSTR or XTR), Digital Secure, Escrowed Encryption Standard (EES), and so on). In various arrangements, the format of the component file can vary depending on the digital asset.

In some arrangements, the data protection object (e.g., Filot) is a data object including, but not limited to, an encryption key (e.g., AES) used to encrypt and later decrypt the digital asset, a key-value map (e.g., used in retrieval of small amounts of data using a known "key" and returning its single corresponding "value") containing the ID hashes as keys, and hashes of the data as values (e.g., key: udj49fJHd; value: ickdf4dmcKde34dkc). The key-value map can be encoded to text and encrypted with the encryption key. As described herein, the component files can be distributed through a DDS protection network by executing (e.g., by a processing circuit) component swaps with other nodes on the DDS protection network in order to increase redundancy and decrease retrieval time of the component files. Component files and the DDS protection network ledgers can both be distributed to DDS protection network nodes using the Filot Distribution Protocol (FDP) as described herein.

Still referring to the present disclosure generally, each file added to the blockchain is subdivided into components and a Filot. The Filot includes the encryption key allowing for the reconstruction and un-encryption of uploaded files. The AES key can be encrypted using the owner's public key. When ownership is transferred to another node, the AES key can be unencrypted, and re-encrypted using the receiving node's public key. As used herein, exchanging (or transacting) refers to the process executed, and transferring refers to the effect of that process being executed. As used herein, "trivial data" refers to the approximations of the number of bytes in the data stored in the component should it be decrypted and what place (or order) in the sequence of unknown components for an indiscernible originating file this component is located. It should be understood, the trivial data does not include file of origin nor the node for which the file is uploaded nor any other information allowing for reconstruction. As used herein, "non-trivial" refers to data other than trivial data. For example, non-trivial data about a given file uploaded to the network can be discerned from a given component, as such details both encrypted and stores a sequence number, ID hash, data hash, and exactly the same number of bytes of encrypted data as every other module as defined by the user, storing no information which allows the identification of the block storing the Filot needed to reconstruct the file. Accordingly, the DDS protection network and Filot utilization minimizes cyber security vulnerabilities of entities (e.g., not storing identifications of blocks storing the Filot, and not storing the data regarding the file of origin nor the node for which the file is uploaded) reduces storage requirements and processing load of the systems described herein such that the overall design of the distributed network architectures are improved.

Components can be distributed to other nodes using a distributed search protocol (DSP). For example, a given node sends a search request to each node in its routing table until a network address to download a given component is found. If a node receives a search request for a component which it does not have the network address to in its routing table, that node performs for the component as well. As used herein, a "search routine" is the process of sending search requests to nodes in its routing table and looping till a network address for a component is found. In this manner, the address for each component is found recursively throughout the DDS protection network, as the search requests are sent through the entire network of nodes until the network address of the component is found. For example, if the requestor does not have the component file, the node can send search requests or routines to other nodes in a recursive search. In the following example, search requests can be responded to with contacts with the requested component file, the new contacts can be added to the routing table 146. In some examples, the DDS protection network ledger is sent by a node using an announcement. When a node generates or receives a validated new ledger data protection object, the node announces the same to each node in its routing table. In this manner, similar to a recursive search routine, eventually the new data protection object is distributed to each node in the network.

In some arrangements, component files can be contextless, such that each component file includes no information which provides context for how to interpret the bytes contained within. In various arrangements, the component files can be contextless, where each component file includes encrypted information which must be unencrypted with an encryption key, such that the encrypted component file includes no information which provides context for how to interpret the bytes contained within. As used herein, "reconstructing" a component file can include: (1) a user transmitting a request to a DDS protection network node 132 for the data protection object associated with the component file attempted to be reconstructed, (2) the computing system of the user (e.g., user device 160) can decrypt the data from the data protection object, (3) the computing system of the user can execute a component file search and request routines for each component file in the manifest (e.g., node ID, data, lists, etc.) of the data protection object that is not already downloaded on the computing system of the user or the DDS protection network node 132 the computing system is communicating with, and (4) in sequential order (as per the sequence number in each component file) the computing system can decrypt the data of the component file, and write to a new component file, and when all component files have been decrypted and written the new component file can be saved to one or more DDS protection network nodes 132 with the file name provided in the data protection object. Furthermore, the new component can then be accessed by the computing system of the user.

Figure 2A:
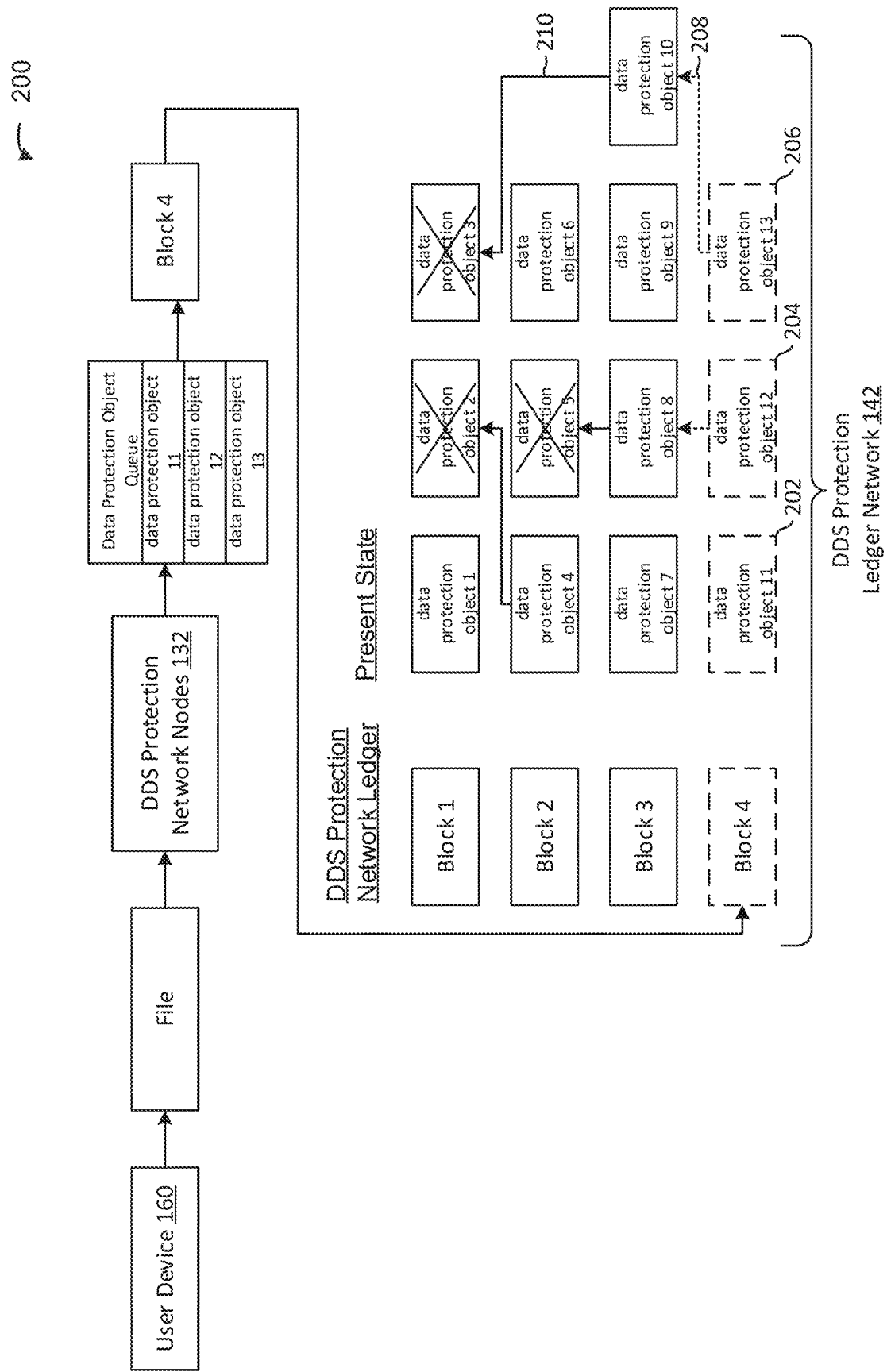
FIG. 2A is a block diagram depicting an example of a DDS protection network ledger in a Filot Distribution Protocol (FDP) 200, according to some arrangements.

In some examples, the FDP is a peer-to-peer (P2P) transfer protocol and is the method (as shown in FIG. 2A) by which file components and the DDS protection network ledger are distributed and transferred to all nodes of a given DDS protection network made with one or more API calls or request to the DDS protection network. Each node can include data, and that data can be assumed to be accessible. In some arrangements, a table can be used to show correspondence between message codes and a description of each message associated with each code. An example of the table is shown in FIG. 3. These codes provide context to different UDP/TCP transmissions in the different interactions defined by the FDP. All transmissions contain a code so that the receiver can validate that a particular interaction is being initiated or correctly performed, by for example checking the table. Furthermore, the codes can allow a receiving node to perform the correct procedure and send the correct message back to the sending node, or should a node receive a message with either an invalid code or a message with a code out of the correct order it will discard it. The correct orders for messages and their codes, and valid codes for the interactions between nodes defined by FDP are stored in the table.

Still referring to the figures generally, every computer or device connected to a DDS protection network can be a node and in order to interact (e.g., send/receive requests, send/receive data) with the DDS protection network and execute FDP interactions, the computers can store a plurality of files. For example, every DDS protection network node can store and maintain a DDS protection network ledger, an open UDP server with a static IP/port, and a routing table containing the information about other nodes including, but not limited to, the node's public key, the node's IP and port, and a list of the ID hashes of the components the node has downloaded.

Referring now to FIG. 1, a block diagram depicting an example of a data protection system 100 on a distributed data storage (DDS) protection network 130 is shown, according to some arrangements. The data protection system 100 is shown to include a DDS protection network 130, a plurality of DDS protection network nodes (e.g., 132A, 132B, 132C, 132D, 132E, and 132F, collectively referred to herein as "DDS protection network nodes 132"), user devices 160, an input/output (I/O) circuit 162, a user application 164, and a network 150. The network 150 may include a local area network (LAN), wide area network (WAN), a telephone network (such as the Public Switched Telephone Network (PSTN)), a wireless link, an intranet, the Internet, or any combination thereof. The data protection system 100 can also include at least one data processing system or processing circuit, such as the DDS protection network nodes 132 and user device 160. User device 160 can communicate via the network 150, for example with DDS protection network nodes 132 on the DDS protection network 130. Referring to both FIGS. 1 and 2, the one or more processing circuits can include a microprocessor, an application specific integrated circuit (ASIC), a field-programmable gate array (FPGA), and so on, or any combination thereof. A memory can include, but is not limited to, electronic, optical, magnetic, or any other storage or transmission device capable of providing processor with program instructions. Instructions can include code from any suitable computer programming language.

In some arrangements, one or more user devices 160 can be executed on one or more processing circuits, such as those described below in detail with reference to FIG. 14. In addition to the processing circuit, the user device 160 may be used by a user to perform various actions and/or access various data (e.g., component files on the DDS protection network 130), some of which may be provided over a network 150 (e.g., Internet, LAN, WAN, and so on, utilizing one or more security protocols, such as Internet Protocol Security (IPSec), Layer 2 Tunning Protocol (L2TP), Point-to-Point Tunneling Protocol (PPTP), Secure Shell (SSH), and so on). The term "user" as used herein may refer to an individual operating user device 160 interacting with resources, exchanging or transferring data. In particular, the user can access and execute services, applications, or programs configured to interact with resources and exchange/transfer data on the DDS protection network 130.

The user device 160 (sometimes referred to herein as a "computing system") may be a mobile computing device, desktop computer, smartphone, tablet, smart watch, smart sensor, or any other device configured to facilitate receiving, displaying, and interacting with data (e.g., component files, information stored on the DDS protection network nodes 132) and resources (e.g., web pages, mobile applications, etc.) and configured to facilitate digital asset interactions (e.g., uploading, downloading, exchanging, or transferring) on the DDS protection network nodes 132. User device 160 may also include an input/output circuit 162 for communicating data over network 150 to DDS protection network nodes 132. User device 160 may also include a user application 164 for facilitating requests to DDS protection network nodes 132.

The user devices 160 may be used to send data and requests (e.g., exchange, transfer, update) to the DDS protection network nodes 132, or may be used to access websites (e.g., using an internet browser), access information (e.g., using a user application) such as user application 164 (sometime referred to as "mobile application"), and/or any other types of information and data. For example, the user device 160 can be configured to execute requests to DDS protection network nodes 132 and analyze and collect information regarding blocks on the DDS protection network ledger 142, data protection objects, and data protection object data requested, collected, and/or provided by DDS protection network nodes 132. In some arrangements, the user device 160 can store (e.g., in memory) a routing table containing contact information, and component IDs of the component downloaded by each user device 160 and DDS protection network node 132 including contact information in the routing table, which can be used to send and receive requests to and from user devices 160 and DDS protection network nodes 132.

In some arrangements, the user application 164 can be a software program running on a processing circuit of the user device 160. The user application 164 can be configured to make and receive requests to and from user devices 160 and DDS protection network nodes 132. The requests via the user application 164 can serve data to the user device 160, generate new data protection objects and send data protection objects to DDS protection network nodes 132 to be added to a block in the DDS protection network ledger 142, and transmit and exchange information with other user devices 160. In some arrangements, the user application 164 can be configured to a set of commands, calls, or requests for interacting with DDS protection network nodes 132.

The user device 160 may be communicably coupled and operate the DDS protection network nodes 132 on the DDS protection network 130. That is, the user device 160 has the role of accessing assets (e.g., component files, data protection objects, or ledger data), modifying assets (e.g., update access control, update hash, storing or removing data) and managing assets (e.g., exchanging or transferring ownership of component files). Assets can be digital representation of a plurality of different assets. For example, an asset could be files (e.g., Computer Aided Design (CAD) files, text file, graphic files, or presentation files), documents, records, images, videos, audio, links, data, public and private keys, and so on. For example, user device 160 can query, via the network 150, one or more DDS protection network nodes 132 for information stored in component files (e.g., assets) on the DDS protection network 130.

Figure 2B:
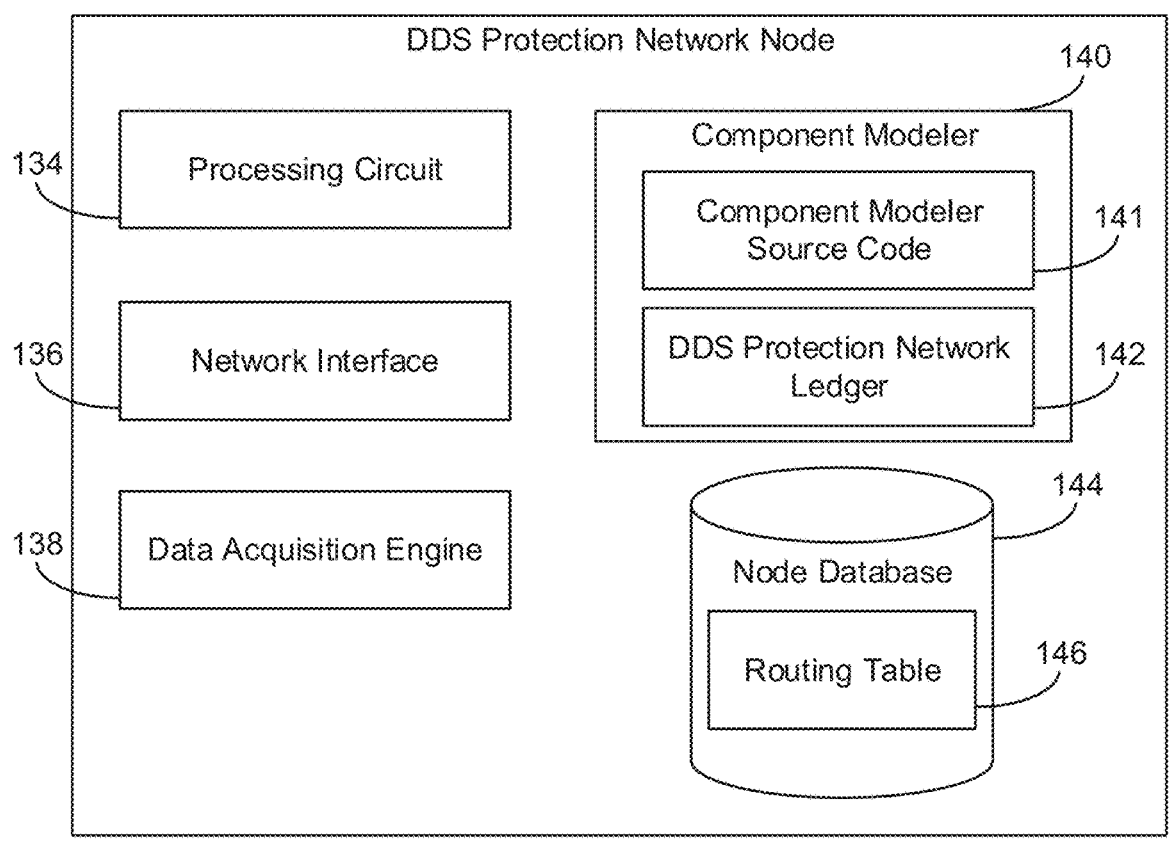
FIG. 2B is a block diagram depicting an example of a DDS protection network node, according to some arrangements.

The system 100 can also include a DDS protection network 130 that can be configured to protect data based on the DDS protection network architecture described herein. The DDS protection network 130 can enable access controls, allow the tracking of access to files and verifying of access to files, secure distribution of files/software (e.g., download clients for video games, word processing software, or other software or games), implement immutable data protection objects of file transfers and access (e.g., digital asset storage, and so on), and so on. The DDS protection network 130 can include a plurality of nodes that are interconnected with one another to form a peer-to-peer network. As shown in FIG. 2B, the DDS protection network 130 includes nodes 132A, 132B, 132C, 132D, 132E, and 132F (collectively referred to herein as "DDS protection network nodes 132") that are interconnected with one another to form the peer-to-peer network. Each of DDS protection network nodes 132 on the DDS protection network 130 include hardware elements, one or more processors (e.g., any general purpose or special purpose processor), and/or be operably coupled to one or more transitory and/or non-transitory storage mediums and/or memory devices (e.g., any computer-readable storage media, such as a magnetic storage, optical storage, flash storage, RAM, and so on). Additional details relating to the features and functionality of the DDS protection network 130 and the DDS protection network nodes 132 are provided herein with respect to FIG. 2B.

As used herein, a "DDS protection network ledger" (e.g., 142 of FIG. 2B and FIG. 2A) can be a data structure including a ledger of blocks, each of which, can contain the hash of the previous block in the ledger, some arbitrary data, and a hash calculated from the previous two items. This DDS protection network ledger can be distributed (e.g., a distributed blockchain) such that DDS protect network nodes 132 can have an up to date copy of the DDS protection network ledger. Furthermore, the DDS protection network nodes 132 can announce to other DDS protection network nodes 132 that a new block has been added to the DDS protection network ledger. In some arrangements, the announcement can be broadcasted until all DDS protection network nodes 132 have either discarded the new block or added it to their DDS protection network ledger. In particular, the method by which the processing circuit of the DDS protection network nodes 132 determine whether or not to add a particular block, is used herein and called the "consensus algorithm." In various arrangements, the validity of a DDS protection network ledger and a block can be determined by sequentially calculating the hash of each block, checking it against the recorded value in the DDS protection network ledger, and if they match the block is valid, and if all blocks in the DDS protection network ledger are valid, the DDS protection network ledger is valid. As shown, this allows for trustless verification that the data stored in the DDS protection network ledger has not been modified. Additional complexities, checks, and processes can be added to this verification/validation process, as is done in the DDS protection network ledger, these added complexities, checks, and processes are described in detail below with reference to FIGS. 2-13.

As used herein, a "DDS protection network node" (e.g., 132 of FIG. 1) can be any computer, server, mobile phone, or any other internet connected device which can maintain a ledger of a DDS protection network ledger. For example, a DDS protection network node can execute instructions to validate new blocks and data protection objects before or during the addition to a DDS protection network ledger. In another example, a DDS protection network node can execute instructions to validate distributed new blocks to other DDS protection network nodes. In yet another example, a DDS protection network node can execute instructions to maintain (e.g., update or modify) a present state (defined and described below) which can be requested by a user (e.g., operating user device 160), such that a user may request (referred to herein as an access request) and receive any block or data protection object from the present state. In some arrangements, a DDS protection network node can maintain a routing table 146 of FIG. 2B containing contact information, and component IDs of the component downloaded by each user and DDS protection network node with contact information in the routing table, which can be used to send and receive some, none, or all requests to and from DDS protection network nodes 132 or user devices 160.

Referring now to FIG. 2A, a block diagram depicting an example of a DDS protection network ledger in FDP 200, according to some arrangements. As used herein, a "block" is a data structure which the DDS protection network ledger 142 uses and implements. For example, when a new block is received by (via an announcement), or generated by a DDS protection network node 132, the new block can be validated before adding it to the DDS protection network ledger 142. A new block can be validated by calculating the hashcode (sometimes referred to herein as a "hash", "hash ID", or "block hash ID") of a previous block from its properties (e.g., metadata, file, and so on), and verifying it is the same hashcode as the new block. Next, the component modeler 140 can validate all data protection objects stored within a list of data protection objects and check the timestamp of the new block verifying it is later than that of the previous block in the DDS protection network ledger 142 (but not later than the current time). Next, the component modeler 140 can verify that the hashcode of the new block is the same as the hashcode of the previous block (both calculated hashcode and the hashcode stored in the DDS protection network ledger 142). Next, the component modeler 140 can verify that the first data protection object in the list of data protection objects is a valid contact data protection object and that the nonce of the previous block generated by the generating DDS protection network node 132 is equal to the nonce of the new block minus one. It should be understood, the steps of the validation of new blocks can be performed in any order.

In some arrangements, each block in the DDS protection network ledger 142 can store a hashcode, a previous hashcode, a timestamp, a nonce, and a list of data protection objects (e.g., each of which can be encoded to a string or an array of bytes format). The hashcode can be calculated by the component modeler 140 based at least one or on a combination of, but not limited to, the hash code of the previous block, a timestamp, a nonce (e.g., an integer value of the number of blocks that have been created by the DDS protection network node 132 which has created the data protection object), and a list of data protection objects. The previous hashcode can be the hash of the value of the previous block in the DDS protection network ledger 142. The timestamp can be the time (e.g., in milliseconds, in nanoseconds, in seconds) of when the block was originally generated. For example, when a block is deserialized (e.g., generating an instance of an object of a particular type using a string and a known serializer or serialization schema (e.g., file which describes how to interpret/convert a string as an instance of a particular type of object)) the timestamp value is not set to the time in which it was deserialized, the timestamp of its original generation is maintained. The nonce can be an integer value representing the number of blocks that has been generated by a particular DDS protection network node 132. Each data protection object in the list of data protection objects can stored as a string (or other type of data type) for later storage and (de) serialization. The list of data protection objects can contain a variable number of data protection objects. Every list can contain at least one data protection object, the first data protection object in the list being a contact data protection object containing the contact for the DDS protection network node 132 which generated the block (sometimes referred to herein as the "generating node").

As used herein, a "data protection object" is a data structure (e.g., file) containing data including context and used, for example, when the data protection object is retrieved by a user device 160 (e.g., operated by a user). It should be understood there can be a plurality of predefined data protection object data types which provide functionality for the DDS protection network ledger 142. Additional data protection object data types can be defined (e.g., with a unique type strings), the data protection object can then be retrieved and the data contained within interpreted. The hashcode of a particular data protection object can be used by the component modeler 140 to identify it when retrieving data stored in a data protection object in a DDS protection network ledger 142. The retrieved data protection object can be decrypted with a private key of the user (e.g., owner). The hashcode can also be used by the component modeler 140 to validate that the data protection object has not been modified (e.g., by calculating the hash of the data protection object and comparing it to the value stored in the DDS protection network ledger 142). A signature can be used by component modeler 140 to validate that the data protection object is being generated by the user device 160 whose public key is stored as the originator public key. This is the case because typically only the origin user device knows and stores its private key (any given user only knows their private key as well). A signature can be validated by the component modeler 140 by decrypting the signature with the deserialized originator public key, and verifying it is the same as the hashcode of the data protection object.

In some arrangements, valid data protection objects can be added to blocks. Data protection objects are considered to be valid if the calculated hashcode of the data protection object is the same as the hashcode stored in the data protection object, the timestamp is later than the timestamp of the most recent block in the DDS protection network ledger 142, but not later than the current time, and the signature of the data protection object is valid. Each data protection object can include, but is not limited to, a timestamp (e.g., when the data protection object was initially generated), a type string (sometimes referred to as the "data protection object data type string", "data protection object type", or "type"), data (e.g., array of bytes, and sometimes referred to as the "data protection object data"), an originator public key encoded bytewise (e.g., public key of the user device 160 which generated the data protection object, and sometimes referred to as the "originator for a particular recipient", "originator for any generic originator", or "originator public key"), a recipient public key encoded bytewise (sometimes referred to as the "recipient for a particular recipient", "recipient for any generic recipient", or "recipient public key"), a hashcode (e.g., sometimes referred to as the "data protection object ID hash", or "data protection object hash"), and a signature. The type string can be a string identifier which can be used to give context to the array of bytes of the particular data protection object. This string is unique to the data protection object, otherwise it would be possible to know how to interpret a set of bytes. The data stored in the particular data protection object can be encoded bytewise (e.g., serialized or converted to a string and then converted to an array of bytes). By default, the public key of the user which is receiving the data protection object can be set to be the same as the originator, which can be left such that the originator is the owner of the data protection object, or it can be modified such that ownership of the data protection object can be cryptographically transferred. The hashcode can be generated by executing a hashing function on the following one or more values from a particular data protection object including, but not limited to, type, timestamp, originator, recipient, and data. The signature can be generated by encrypting the hashcode of a particular data protection object with the private key of the user device 160 generating the data protection object (origin user device or origin user).

The component modeler 140 can create sub-chains within the DDS protection network ledger 142 by referencing previous blocks and data protection objects in the DDS protection network ledger 142. For example, the most recent block in a sub-chain is the present state block of that sub-chain. The most recent data protection object in a sub-chain is the present state data protection object of that sub-chain. In some arrangements, sub-chains can be used to track the current state of a particular data protection object in a DDS protection network ledger 142. In particular, within a sub-chain, all modifications to that data protection object, all previous states of that data protection object, all ownership transfers of that data protection object, and any other retroactive changes to that data protection object can be traceable and tracked through the sub-chain of a data protection object. In some arrangements, a sub-chain can be generated using retroactive data protection objects (described below). Retroactive data protection objects can contain the ID hash of the data protection object which the retroactive data protection object overrides, and the ID hash of the block containing the overridden data protection object. The most recent retroactive data protection object (the one that has not yet been overridden) can be determined to be the present state data protection object, and the block which contains it to be the present state block. A sub-chain can be generated by starting with the present state data protection object and block, getting the data protection object and block overridden by the present state data protection object and block using the ID hashes of that block and data protection object stored in the present state data protection object from the DDS protection network ledger 142, by repeating this retrieval process with each subsequent block and data protection object until a data protection object is reached which is not a retroactive data protection object, and storing each retrieved data protection object and block at each step, the sub-chain can be generated.

As used herein, a "retroactive data protection object" is a data structure that sub-chains are structured of and which allows for the maintaining of the present state. Retroactive data protection objects are a specific data protection object data type, with specific context used to interpret the data stored within. When validating a new data protection object, a DDS protection network node 132 will check if the type matches the type of any retroactive data protection objects (such as transactions or edits). A retroactive data protection object can be used after an original data protection object has been generated. A retroactive data protection object can be additional checks which must be satisfied in order to be considered valid. In order to be considered a valid retroactive data protection object the following must be satisfied, but is not limited to (1) the block of the provided block ID hash exists and contains a data protection object with an ID hash matching the provided ID hash for the previous data protection object, (2) the present state contains the data protection object with an ID hash matching the ID hash of the data protection object to be overridden provided by the retroactive data protection object, (3) the modified data protection object type matches the type of the data protection object being overridden, and (4) the originator of the retroactive data protection object matches both the originator of the data protection object containing the retroactive data protection object, and recipient of the data protection object being overridden. When a Data protection object with a retroactive data protection object is added to a block, and if that block is added to a DDS protection network ledger 142, the retroactive data protection object can replace the previous present state data protection object in the present state.

Each retroactive data protection object can include, but is not limited to, a retroactive data protection object type (e.g., transaction/exchange or edit), a modified data protection object type (e.g., type of data protection object being modified), an original data protection object block ID Hash (e.g., the ID hash of the block containing the data protection object which is being overridden, which can be used to find the data protection object later when generating a sub-chain, and in validating a retroactive data protection object), an original data protection object ID hash (e.g., the ID hash of the data protection object which is being overridden, which can be used to find the data protection object later when generating a sub-chain and in validating a retroactive data protection object), an originator public key (e.g., the public key of the user device 160 which generated the data protection object), a recipient public key (e.g., the public key of the user device 140 which is receiving the data protection object, which by default can be set to be the same as the originator, can be left such that the originator is the owner of the data protection object, or it can be modified such that ownership of the data protection object can be cryptographically transferred).

A transaction data protection object can be a type of retroactive data protection object which cryptographically transfers access controls to a piece of data from one user (the originator) to a different user (the recipient). When a transaction data protection object is signed by the originator, the transaction data protection objects data is decrypted using the originator's private key, and then re-encrypted using the recipient's public key. Thus, when the transaction data protection object is added to a block and then that block to a DDS protection network ledger 142, the present state can be updated (e.g., by component modeler 140). If the present state is then checked for what data protection objects the recipient owns, the transaction data protection object will now be one of the recipient's owned data protection objects. The opposite is true of the originator, the data protection object which was overridden by the transaction data protection object will no longer be in the present state, and they will no longer be able to decrypt the data within the transaction data protection object, whereas the recipient is now able to decrypt and access the data stored in the transaction data protection object. An edit data protection object can be a type of retroactive data protection object which modifies the data stored in a data protection object and overrides the previous data protection object in the present state. When generating an edit data protection object, by the component modeler 140, the data stored in the previous data protection object is modified, and then the edit data protection object's data is set equal to that modified data. The edit data protection object allows for already existing data protection objects to be updated or modified.

As used herein, a "present state" is all the present states of data protection objects and blocks of a DDS protection network ledger 142. It is from the present state that DDS protection network nodes 132 can retrieve data from to respond to requests and announcements. Therefore, an up-to-date present state contains the present state of all data protection objects in a DDS protection network ledger 142. If a data protection object or block is requested by a user device 160 or a DDS protection network node 132 which is not found in the present state, the ID hash of the present state block and the ID hash of the present state data protection object can be used in order to be retrieve the present state. The data protection objects owned by any particular user device 160 (e.g., a user) can be retrieved by searching the present state for data protection objects with the recipient matching a particular user's public key. The present state can be re-generated by parsing a DDS protection network ledger 142 (e.g., by component modeler 140) from the genesis block to the most recent block, updating the present state as each block is parsed, when the final block in the DDS protection network ledger 142 is reached, the present state is then up to date. The present state can be validated (e.g., by component modeler 140) by re-generating a copy of the present state and verifying that the present state matches the copy. In particular, when a new block is added, a DDS protection network node 132 can parse each data protection object in the new block. As the DDS protection network node 132 parses each data protection object, if a data protection object is a retroactive data protection object type, the previous data protection object which it overrides is removed from the present state and the new data protection object is added. Otherwise, the data protection object is added to the present state. Each block has a row in the present state, with a variable number of records stored within. If a row becomes empty as the present state evolves, it is removed from the present state.

As shown in FIG. 2A, the FDP 200 can be implemented by the component modeler 140 to configure and manage data protection objects. In particular, the user device 160 can upload or transmit a file (e.g., digital asset) to the DDS protection network nodes 132 and the DDS protection network nodes 132 can, in turn, generate component files (e.g., splitting the file into a plurality of smaller files) and generate a data protection object. In some arrangements, the FDP 200 can queue the data protection objects prior to updating the DDS protection network ledger 142. In various arrangements, the FDP 200 can update the DDS protection network ledger 142 without queue other data protection objects. As shown, Block 4 can be generated which can include the plurality of data protection objects (or one data protection object) and can be added to the DDS protection network ledger 142. In particular, the dashed lines of Block 4 and data protection object 11, data protection object 12, and data protection object 13 are shown as dashed because Block 4 has not been validated (as described in detail above). Prior to (or after) Block 4 is validated, sub-chains (e.g., 208 and 210) can be generated by traversing various blocks in the DDS protection network ledger 142 (e.g., Block 3, Block 2, and Block 1) associated with the same digital asset. For example, a text file is updated and data protection object 13 was created, the previous "versions" including different data than the new updated text file can be updated to be retroactive data protection objections. As such the newest retroactive data protection objection (e.g., the updated text file) can be the present state data protection object 206. In some arrangements, a version can be based on, but is not limited to, a file including different data than the new updated text file such as: (1) a new owner (e.g., recipient claimed the file) (referred to herein as "a transfer request"), an exchange occurred (e.g., between the originator and the recipient) (referred to herein as "an exchange request"), an update to the content of the file (referred to herein as "an update request"), or the owner desires to download and/or remove the file from the DDS protection network nodes 132 (referred to herein as "an access request"). Also as shown, the crossed out data protection objects (e.g., data protection object 2, 3, and 5, and after validating the new data protection objects 12 and 13, the data protection object 8 and 10 will be crossed out) refers to data protection objects of a file (or digital asset) but that are not in the present state. For example, the data protection objects that are crossed out may have been updated, exchanged, transferred, accessed, and so on.

Referring now to FIG. 2B, a block diagram depicting an example of a DDS protection network node 132 of the DDS protection network 130 in FIG. 1 is shown, according to some arrangements. That is, any of the nodes (e.g., 132A, 132B, 132C, 132D, 132E, and 132F) in FIG. 1 may be a DDS protection network node 132 in FIG. 2B. While various circuits, interfaces, and logic with particular functionality are shown, it should be understood that the DDS protection network node 132 can include any number of circuits, interfaces, and logic for facilitating the functions described herein. For example, the activities of multiple circuits may be combined as a single circuit and implemented on a single processing circuit (e.g., processing circuit 134), as additional circuits with additional functionality are included.

The DDS protection network node 132 can be run or otherwise be executed on one or more processors of a computing device, such as those described below in detail with reference to FIG. 14. In broad view, the DDS protection network node 132 can include a processing circuit 134, a network interface 136, a data acquisition engine 138, a component modeler 140, component modeler source code 141, a DDS protection network ledger 144, a node database 144, a routing table 146, and a component dataset 148. In some arrangements, the DDS protection network node 132 can include a processing circuit 134 composed of one or more processors and memory.

The DDS protection network node 132 can include a network interface 136 configured to establish a communication session with a computing device for sending and receiving data over the network 150 to the computing device. Accordingly, the network interface 136 includes a cellular transceiver (supporting cellular standards), a global positioning system (GPS) transceiver (supporting GPS standards), a local wireless network transceiver (supporting 802.11X, ZigBee, Bluetooth, Wi-Fi, or the like), a wired network interface, a combination thereof (e.g., both a cellular transceiver, GPS transceiver, a Bluetooth transceiver, and so on), and/or the like. In some arrangements, the DDS protection network node 132 includes a plurality of network interfaces 136 of different types, allowing for connections to a variety of networks, such as local area networks or wide area networks including the Internet, via different subnetworks.

The DDS protection network node 132 can include a data acquisition engine 138. The data acquisition engine 180 can include one or more processing circuits configured to execute various instructions. In various arrangements, the data acquisition engine 138 can be configured to facilitate communication (e.g., via network DDS protection network 130 and network 150) between the DDS protection network nodes 132 and systems and devices described herein (e.g., user devices 160). The facilitation of communication can be implemented as an application programming interface (API) (e.g., REST API, Web API, or customized API), batch files, SDK, and/or queries. In various arrangements, the data acquisition engine 138 can also be configured to control access to resources of the provider system 110, provider database 120, and provider ledger system 125.

One or more APIs can be used by the data acquisition engine 138 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of an SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

In some arrangements, the data acquisition engine 138 can configured to receive input (e.g., announcements, component swap requests, component request, TCP transmissions, exchange request, transfer request, update request, access request, and so on) and provide information to other DDS protection network nodes 132 and user device 160. In this regard, the data acquisition engine 138 is structured to exchange data, communications, instructions, and so on with an input/output component of the DDS protection network node 132. Accordingly, data acquisition engine 138 may be any electronic device that conveys data to a user or other nodes (e.g., 132) by generating sensory information (e.g., a visualization on a display, one or more sounds, tactile feedback, and so on) and/or converts received sensory information from a user or other nodes into electronic signals (e.g., a keyboard, a mouse, a pointing device, a touch screen display, a microphone, and so on). One or more user interfaces may be internal to the housing of the DDS protection network node 132, such as a built-in display, touch screen, microphone, and so on, or external to the housing of the DDS protection network node 132, such as a monitor connected to the DDS protection network node 132, a speaker connected to the DDS protection network node 132, and so on, according to various arrangements. In some arrangements, the data acquisition engine 138 includes communication circuitry for facilitating the exchange of data, values, messages, and the like between the data acquisition engine 138 and the components of the DDS protection network node 132. In some arrangements, the data acquisition engine 138 includes machine-readable media for facilitating the exchange of information between the data acquisition engine 138 and the components of the DDS protection network node 132. In still another arrangement, the data acquisition engine 138 includes any combination of hardware components (e.g., a touchscreen or biometric sensory), communication circuitry, and machine-readable media.

The data acquisition engine 138 can be further configured to generate and/or manage a node identifier associated with the DDS protection network node 132. The node identifier may include any type and form of identification used to distinguish the DDS protection network node 132 from other computing devices and/or other DDS protection network nodes. In some arrangements, a node identifier may be associated with one or more other node identifiers. In some arrangements, to preserve privacy, the node identifier may be cryptographically generated, encrypted, or otherwise obfuscated by any circuit of the DDS protection network node 132. In some arrangements, the DDS protection network node 132 may include the node identifier in any communication (any of the commands in FIGS. 1 and 3-13, e.g., announcements, component swap requests, component request, TCP transmissions, and so on) that the DDS protection network node 132 sends to a computing device.

The DDS protection network node 132 can include a component modeler 140 composed of component modeler source code 141 and a DDS protection network ledger 142. The component modeler source code 141 may be stored in memory of processing circuit 134, which may be accessed by and/or run on processing circuit 134. The DDS protection network ledger 142 may be stored on the same and/or different processor readable memory, which may be accessible by processing circuit 134 when running the component modeler source code 141. In some arrangements, the DDS protection network ledger 142 on a first node (e.g., node 132A in FIG. 1) of a DDS protection network 130 corresponds with the DDS protection network ledger 142 of one or more nodes within the DDS protection network 130, to the extent that the nodes have synchronized/updated their DDS protection network ledger 142 (e.g., received the latest updates via a download, swap, announcement, or during a reconciliation process). Accordingly, the DDS protection network ledger 142 may be a private ledger or a public ledger.

In some arrangements, updates (e.g., component request, component swaps, announcements, and/or component searches) on a DDS protection network 130 includes utilizing smart contracts (e.g., virtual contracts/agreements). As used herein, the phrase "smart contract" generally refers to a self-executing code (e.g., in a DDS protection network 130 or other system) that executes when a set of conditions that have been agreed upon by the parties of the smart contract are met. Although the figures and specification generally discuss utilizing smart contracts on component files, the systems, methods, and apparatuses disclosed herein can also be used for a plurality of and types of files. That is, parties to a smart contract may be nodes and systems and devices described herein (e.g., node 132A and node 132B, node 132A and user device 160, and so on).

The DDS protection network node 132 can include at least one node database 144. The node database 144 can include data structures (e.g., datasets) for storing information such as the metadata about files (e.g., public and private key pairs), access control information, routing information, DDS protection network node information, or additional information. Further, the data stored in the node database 144 may include personal information (e.g., names, addresses, phone numbers, and so on), authentication information (e.g., username/password combinations, device authentication tokens, security question answers, unique user identifiers, biometric data, geographic data, social media data, and so on), and file information (e.g., token information, account numbers, creation date, last modified date, owner, exchange histories, and so on) relating to the various component files and/or other files.

The node database 144 can be part of the DDS protection network node 132, or a separate component that the DDS protection network node 132 and user devices 140 can access via the network 150. The node database 144 can also be distributed throughout DDS protection network 130 and/or data protection system 100. For example, the node database 144 can include multiple databases associated with the DDS protection network nodes on the DDS protection network 130, user devices 160, or both. In some arrangements, each node on the DDS protection network 130 (e.g., 132A, 132B, 132C, 132D, 132E, and 132F) includes a database such that each database contains some similar data. In some arrangements, each data structure can be combined into one dataset. The node database 144 can include a data structure (e.g., dataset) associated with a routing table 146. The routing table 146 can store information about the particular node and other nodes and the user devices 160 including, but not limited to, the node's public key, the node's IP and port, a list of the ID hashes of the components the node has downloaded, real-time storage capacity, historical request, swap, and announcement data, and so on.

In some arrangements, the component modeler 140 (e.g., via data acquisition engine 138 on DDS protection network 130) of DDS protection network node 132 may be configured to send and/or receive, via the DDS protection network 130, data associated with requests (e.g., regarding component files) to other DDS protection network nodes 132 (e.g., 132). In some arrangements, after a successful completion and/or failure of an execution of a command/commands, the processing circuit 134/network interface 136 may provide a confirmation/failure notification to one or more systems described herein (e.g., another data protection network node 132 or user device 160 of FIG. 1).

In various arrangements, the component modeler 140 can also be configured to execute and configure the access controls of the records (e.g., retroactive record, transaction record, edit records). In particular, the access controls can be managed by the present state. When requesting a record from a DDS protection node 132, if the record is not contained in the present state, the component modeler 140 cannot retrieve it directly. Instead, records in the present state are able to be directly retrieved. Overridden records (records which have been overridden by a retroactive record), can be accessed by requesting the sub-chain of the latest record in the sub-chain which contains the overridden record. As the most recent record in a sub-chain can be directly retrieved from the DDS protection node 132 by a user, the current owner is able to decrypt and access the data stored within. It is through this that access controls can be managed by the component modeler 140. For example, if Alice transacts a record to John, after the new retroactive record has been added to a block in the DDS protection ledger 142, and that new ledger record has been distributed to each DDS protection node 132 on the DDS protection network 130, as the data stored within the retroactive record has been encrypted with Alice's public key, only she will be able to decrypt the data.

In some arrangements, the component modeler 140 can also be configured to execute various instruction to perform, but is not limited to, announcements (described in detail with reference to FIG. 4), component searches (described in detail with reference to FIG. 5), component requests (described in detail with reference to FIG. 6), component swaps (described in detail with reference to FIG. 7), retrieval of a components (described in detail with reference to FIG. 8), file conversions to components (described in detail with reference to FIG. 9-10), determining mining difficulty (described in detail with reference to FIG. 11), and file ownership transfer (described in detail with reference to FIG. 12). Additional details regarding the execution of instructions to perform the various operations are described in detail below with FIGS. 4-12.

As used herein, the "Filot Distribution Protocol (FDP)" (e.g., 200) is implemented by the component modeler 140 based on using one or more APIs to communicate with other DDS protection network nodes 132. In particular, the API requests can include component file requests, validating user identities utilizing (e.g., perform exchanges or transactions, modifying records) the DDS protection network ledger 142, exchange requests (e.g., exchange, transfer, update, access). In general, the API requests can standardize interactions between DDS protection nodes 132 and user devices 160. For example, requesting components files from user devices 160 or DDS protection network nodes 130, requesting records from nodes, or sending a record to a DDS protection network node 132 to be added to a block in the DDS protection network ledger 142.

Referring to the DDS protection network ledger 142 generally (sometime referred to herein as a "ledger", "network", or "blockchain"). The DDS protection network ledger 142 can include a key dataset and a digital asset ledger (described in detail with reference to FIG. 2A). The DDS protection network ledger 142 can be configured to store and/or maintain any of the information described herein (e.g., data protection objects), smart contracts, public and private key pairs, etc.). In some arrangements, the described DDS protection network ledger 142 and methods involve utilizing one or more processing circuits. The one or more processing circuits allow receiving, collecting, and sending of requests, announcements, data (e.g., component files, data protection objects), transmissions, exchange and transfer requests, update requests, access requests, public and private key pairs, metadata, and so on. The one or more processing circuits can then communicate with one or more nodes (e.g., 132A, 132B, 132C, 132D, 132E, and 132F) of the DDS protection network 130 and execute one or more instructions or smart contracts stored on the nodes to perform various functions.

In various arrangements, the key dataset can include a plurality of public and private key pairs (referred to hereafter as "key pairs"). In some arrangements, the DDS protection network ledger 142 can include a hardware security module (HSM) that can manage cryptographic keys. Each key pair can be stored in the key dataset utilizing a cryptographic function. For example, the cryptographic function could be a homomorphic encryption function. In another example, the cryptographic function could be any symmetric encryption function (e.g., Triple Data Encryption Standard (TDES), RC5, Advanced Encryption Standard (AES), Blowfish, CAST, and so on), and/or asymmetric encryption function (e.g., Rivest-Shamir-Adleman (RSA), Efficient and Compact Subgroup Trace Representation (ECSTR or XTR), Digital Secure, Escrowed Encryption Standard (EES), and so on). In some arrangements, the private key can be used to encrypt data (e.g., using a cryptographic function) at the source system (e.g., user device 160, component modeler 140 of a DDS protection network node 132, and so on) when access to the digital asset or split digital asset (e.g., component file) is modified, an exchange or transfer occurs (e.g., send component file or digital asset from a source address to a destination address). In various arrangements, the public key can be used by the destination system (e.g., user device 160, component modeler 140 of a DDS protection network node 132, and so on) to decrypt the encrypted component file or digital asset.

In some arrangements, each of the distributed data storage nodes 132 may store a copy of an individual component file or digital assets associated with a user. Each individual asset or file may have one or more fields. Additional details and examples relating to arrangements of component files and digital assets on the DDS protection network ledger 142 are described in detail with reference to FIGS. 3-12.

In various arrangements, the plurality of nodes on the distributed data storage nodes 132 could be interconnected with the plurality of distributed data storage nodes 132 to form a peer-to-peer network (e.g., distributed ledger network). In the following arrangement, each node may contain a copy or some similar information (e.g., if component files are distributed randomly) of a DDS protection network ledger 142 can operate as individually which may contain a copy of a plurality of component files and digital assets associated with the one or more users. Additionally, each distributed data storage node 132 could be configured to determine functions to perform based on communications. While various circuits, interfaces, and logic with particular functionality are shown, it should be understood that the distributed data storage nodes 132 can include any number of circuits, interfaces, and logic for facilitating the functions described herein. For example, the activities of multiple circuits may be combined as a single circuit and implemented on a single processing circuit, as additional circuits with additional functionality are included.

In some arrangements, the instructions to perform the various operations may cause the DDS protection network node 132 to send the instructions (or copies thereof) to other nodes in the DDS protection network 130, thereby causing those nodes to also perform the operations. The DDS protection network node 132 can include a bus (not shown, discussed in detail with reference to FIG. 14), such as an address/data bus or other communication mechanism for communicating information, which interconnects circuits and/or subsystems (e.g., component modeler 140) of the DDS protection network node 132. In some arrangements, the DDS protection network node 132 may include one or more of any such circuits and/or subsystems.

In various arrangements, some, or all of the circuits of the DDS protection network node 132 may be implemented with the processing circuit 134. For example, any of the DDS protection network node 132 may be implemented as a software application stored within the memory and executed by the processor of processing circuit 134. Accordingly, such arrangement can be implemented with minimal or no additional hardware costs. In some arrangements, any of these above-recited circuits rely on dedicated hardware specifically configured for performing operations of the circuit.

As shown, the arrangements described herein improve current distributed network architectures that would otherwise need, if even possible, significant computing time, processing power, and network bandwidth to manage access controls of subdivided (or split) files (e.g., into component files) on nodes of a distributed network. That is, due to the nature of distributed network and the architecture around protection and privacy to digital assets, utilizing the disclosed distributed network architecture increase security of the data (e.g., split and distributed across the DDS protection network utilizing component files including an encrypted file and a data protection object) and reduces, computing time, processing power, and network bandwidth (e.g., all used in managing files and access control on a distributed network), enabling computing devices (e.g., DDS protection network nodes) to execute other instruction that could not been executed previously.

Referring now to FIGS. 3-12 generally, implementations of the FDP that can be executed by various systems and devices described herein. In some arrangements, the FIGS. 3-12 relate to the actions performed on the DDS protection network 130 by DDS protection network nodes 132.

Referring now to FIG. 3, an illustration of an example table of message codes, according to some arrangements. As shown with reference to FIGS. 4-7, the message codes can be used when communicating and send information between DDS protection network nodes 132. In particular, the message codes can be identifiers to that the computing systems and devices described herein can use to identify the type of requests or and/or what execution is requested.

Figure 4:
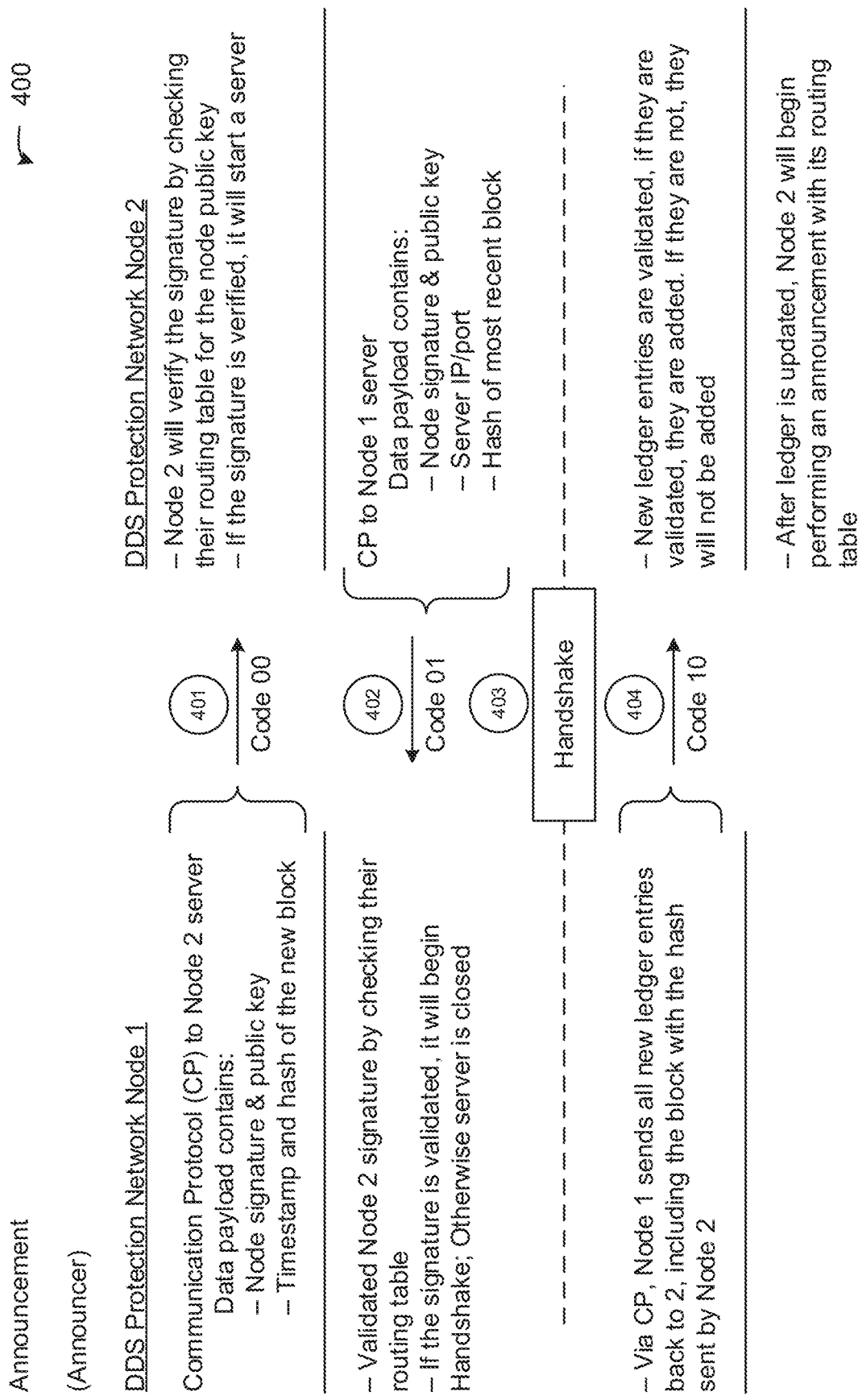
FIG. 4 is a block diagram depicting an example announcement flow in connection with the data protection system of FIG. 1, according to some arrangements.

Referring now to FIG. 4, a block diagram depicting an example announcement flow in connection with the data protection system 100 of FIG. 1, according to some arrangements. Component modeler 140 can perform the steps. In some examples, when a DDS protection network node 132 (e.g., in particular component modeler 140) generates or receives notice of a new data protection object, DDS protection network node 132 can perform or execute an announcement. The originator node (whether it generated the new data protection object or received an announcement of it) of an announcement is the announcer. The announcement is sent to the nodes in the announcer's routing table. The interaction with each node is shown in FIG. 2. At 401, DDS protection network node 1 (e.g., 132A) can, utilizing a communication protocol (CP) (e.g., transmission control protocol (TCP), user datagram protocol (UDP), hypertext transfer protocol (HTTP), file transfer protocol (FTP), simple mail transfer protocol (SMTP), secure socket layer (SSL), and so on) over the DDS protection network 130 or network 150, transmit an announcement to DDS protection network node 2 (e.g., 132B) that can include a data payload including, but not limited to, a node signature, a public key, a timestamp, and a hash of a new block in the DDS protection network ledger 142. DDS protection network node 2 can verify the signature by checking the routing table for the node public key (e.g., in routing table 146) and if the signature is verified can start a server (e.g., client-server relationship, where the server is DDS protection network node 1 and the client is DDS protection network node 2). At 402, the DDS protection network node 2 can generate a data payload including, but not limited to, a node signature, a public key, a server IP/port, and a hash of most recent block (e.g., Block 4 of FIG. 2B). In response, DDS protection network node 1 can validate the signature by cross-referencing routing table 146 and if the signature is validated begins a handshake between the nodes. At 403, a handshake between the nodes can be executed. In general, a handshake establishes a specified communication session whereby the previous communication session is verified and the specified communication session is authorization. At 404, via the CP, the DDS protection network node 1 can transmit all new ledger entries back to DDS protection network node 2, including the block with the hash sent by DDS protection network node 2. In response, the new ledger entries can be validated and if they are validated that can be added to the DDS protection network ledger 142. After the ledger is updated, the DDS protection network node 2 will begin performing an announcement with its routing table 146.

Figure 5:
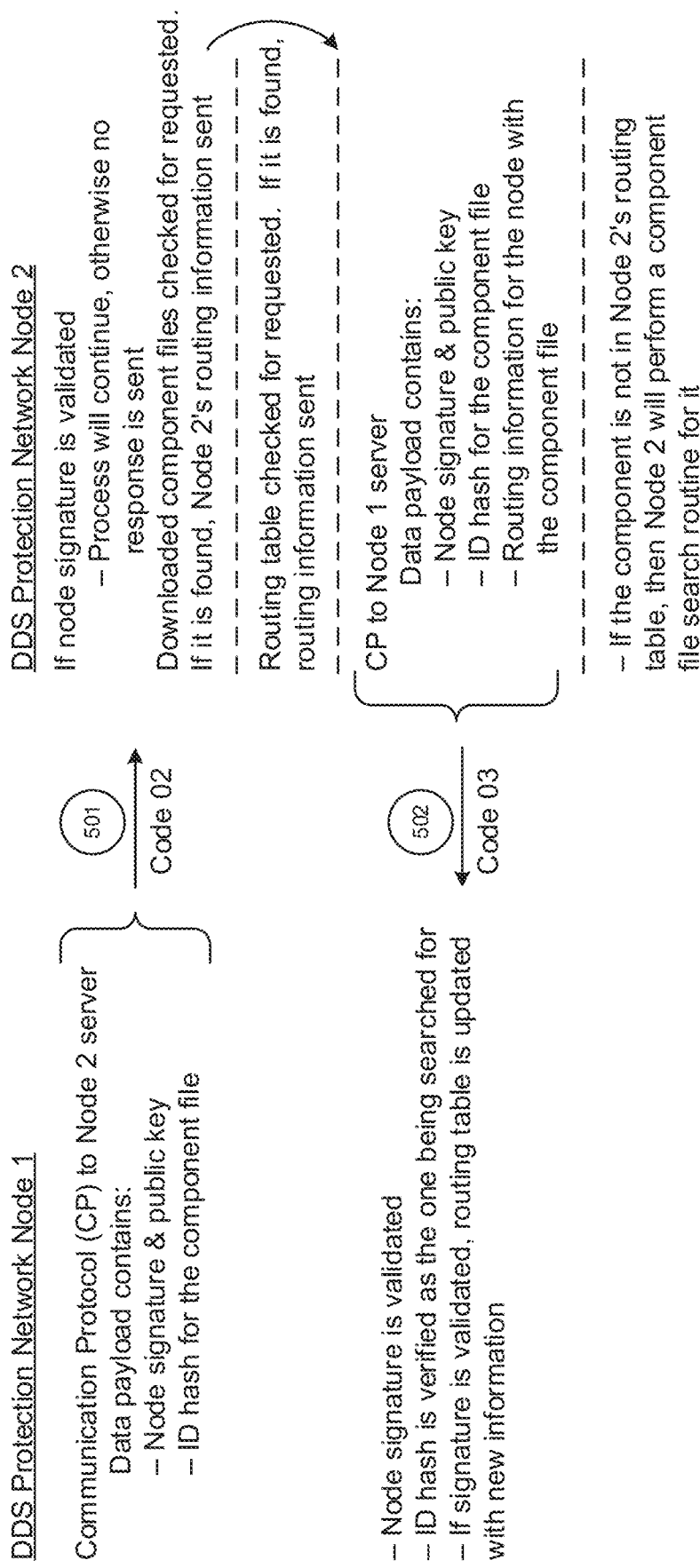
FIG. 5 is a block diagram depicting an example search flow in connection with the data protection system of FIG. 1, according to some arrangements.

Referring now to FIG. 5, a block diagram depicting an example search flow in connection with the data protection system 100 of FIG. 1, according to some arrangements. Component modeler 140 can perform the steps. In some examples, a module search is used by the owner of a component file to determine a location from which a component file can be downloaded. A component file search occurs if the node (e.g., 132) does not know or have the location from which the component file can be downloaded in its routing table 146. As node can execute the following process shown in FIG. 5 for each node in its routing table, repeating until the node has the component file that the node is searching for. If the node receives the routing information for the component file, the node will stop sending search requests. If a node is currently in the process of searching for a component file and receives a search request, and the node does not have the routing information for that component file, the node will not search for that component. A specific example of the module search mechanism is shown in FIG. 5. At 501, the DDS protection network node 1 (e.g., 132A) can, utilizing a communication protocol (CP) over the DDS protection network 130 or network 150, transmit a component file search request to DDS protection network node 2 (e.g., 132B) that can include a data payload including, but not limited to, a node signature, a public key, and an ID hash for the component file. At 502, if the node signature is validated the process will continue. For example, the component file can be downloaded and the routing information and the data payload can be sent to node 1. Node I can in turn validate the node signature, the ID hash, and the routing table 146 can be updated with the new information Referring now to FIG. 6, a block diagram depicting an example component request flow in connection with the data protection system 100 of FIG. 1, according to some arrangements. Component modeler 140 can perform the steps. At 601, after the routing information needed to download a component file is in routing table 146 of the DDS protection network node 132, a component file request will be sent to a node with the component file. In particular, node 1 (e.g., 132) can transmit a data payload including a signature, a public key, and an ID hash for a first component file. The routing information to send the request is determined during a search routine as described herein. After the receiving node has been verified that this component file from this node has not been blacklisted (e.g., by checking against a blacklist), the request can be sent. At 602, component files will be downloaded to a user-specified directory (the component file directory) for long term local storage. All component files downloaded (through both component file swaps and component file requests) will be downloaded to the component file directory. In response, node 1 can receive a fourth data payload including, but not limited to, a signature, a public key, and the ID hash for the first component file. At 603, node 1 and node 2 can establish, utilizing a CP handshake, a connection and then receive, by node 1, the first component file and storing the first component file. Once a component file has successfully been downloaded, if the component file was requested for a component file swap, the process is now complete. If the component file was requested to be reconstructed (the requesting node has ownership of the block containing the data protection object referring to that component file), the node receiving the component file would validate the integrity of the component file data. This can be done by decrypting the data within the component file, performing a hashing function on that component file data, and verifying that the result of which is the same as both the data hash in the component file and in the component file map. If the component file is found to be invalid, the component file will be deleted and its blacklist updated. A specific example of the module request mechanism is shown in FIG. 4.

Figure 7:
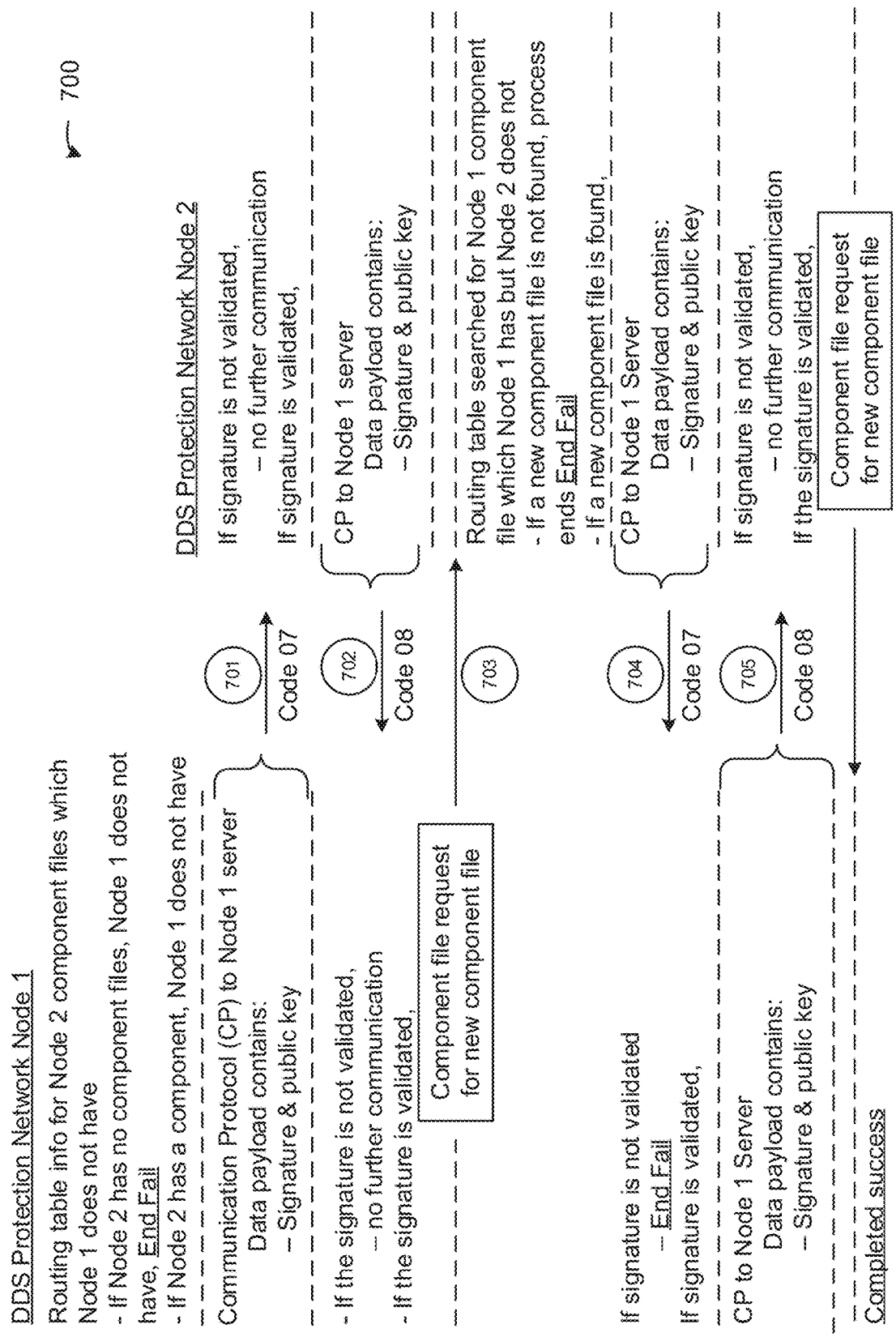
FIG. 7 is a block diagram depicting an example component swap flow in connection with the data protection system of FIG. 1, according to some arrangements.

Referring now to FIG. 7, a block diagram depicting an example component swap flow in connection with the data protection system 100 of FIG. 1, according to some arrangements. Component modeler 140 can perform the steps. Component file swaps are the mechanism by which component files are distributed through the DDS protection network 130 on various nodes. The frequent occurrence of component file swaps ensures that component files will propagate through a given DDS protection network 130. The farther a given component file propagates through the network, the fewer nodes used to perform a search routine when a distant node requests it, thus reducing the time and resources needed for any node to retrieve the component file. Component swaps can be performed automatically once conditions, such as after a period of time or after a certain number of downloads and/or uploads have been performed by the node (e.g., defined by the customer are met). The node can perform the following process (shown in FIG. 7) for each node in its routing table 146 until the sequence is successfully completed. A component file swap is considered successfully completed for a given node once the node has successfully received a component file which the node does not have and sent a component file to another node which the other node did not have. A specific example of the module swap mechanism is shown in FIG. 5. At 701, node 1 (e.g., 132) can transmit to node 2 a data payload including a signature and a public key. At 702, node I can receive from node 2 a data payload including a signature and a public key. At 703, node 1 can request from node 2 a first component file, and at 704 can receive from node 2 a data payload including a signature and a public key associated with the first component file. In various arrangements, the same steps can be performed by node 2 shown at 704 and 705.

Figure 6:
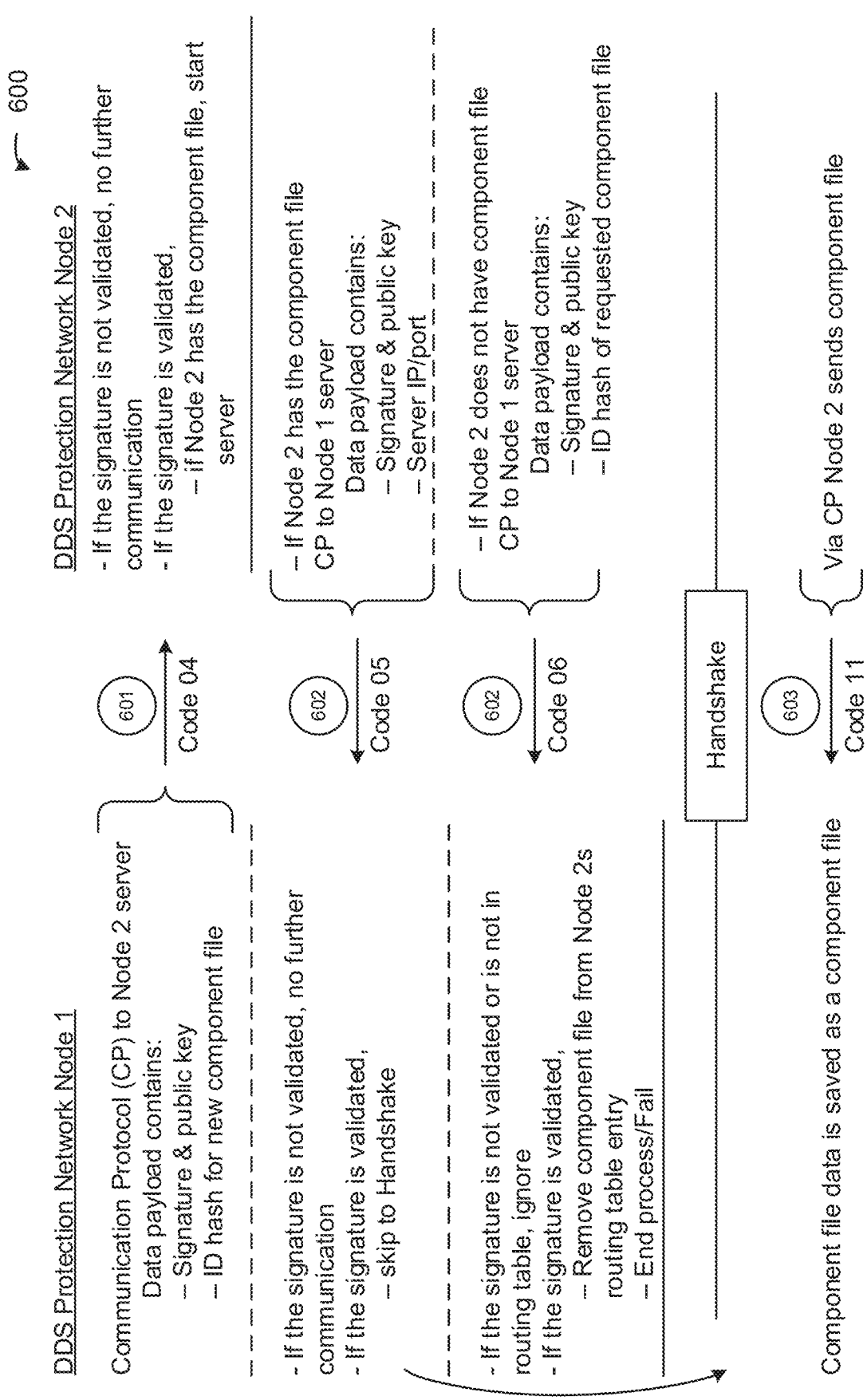
FIG. 6 is a block diagram depicting an example component request flow in connection with the data protection system of FIG. 1, according to some arrangements.
Figure 8:
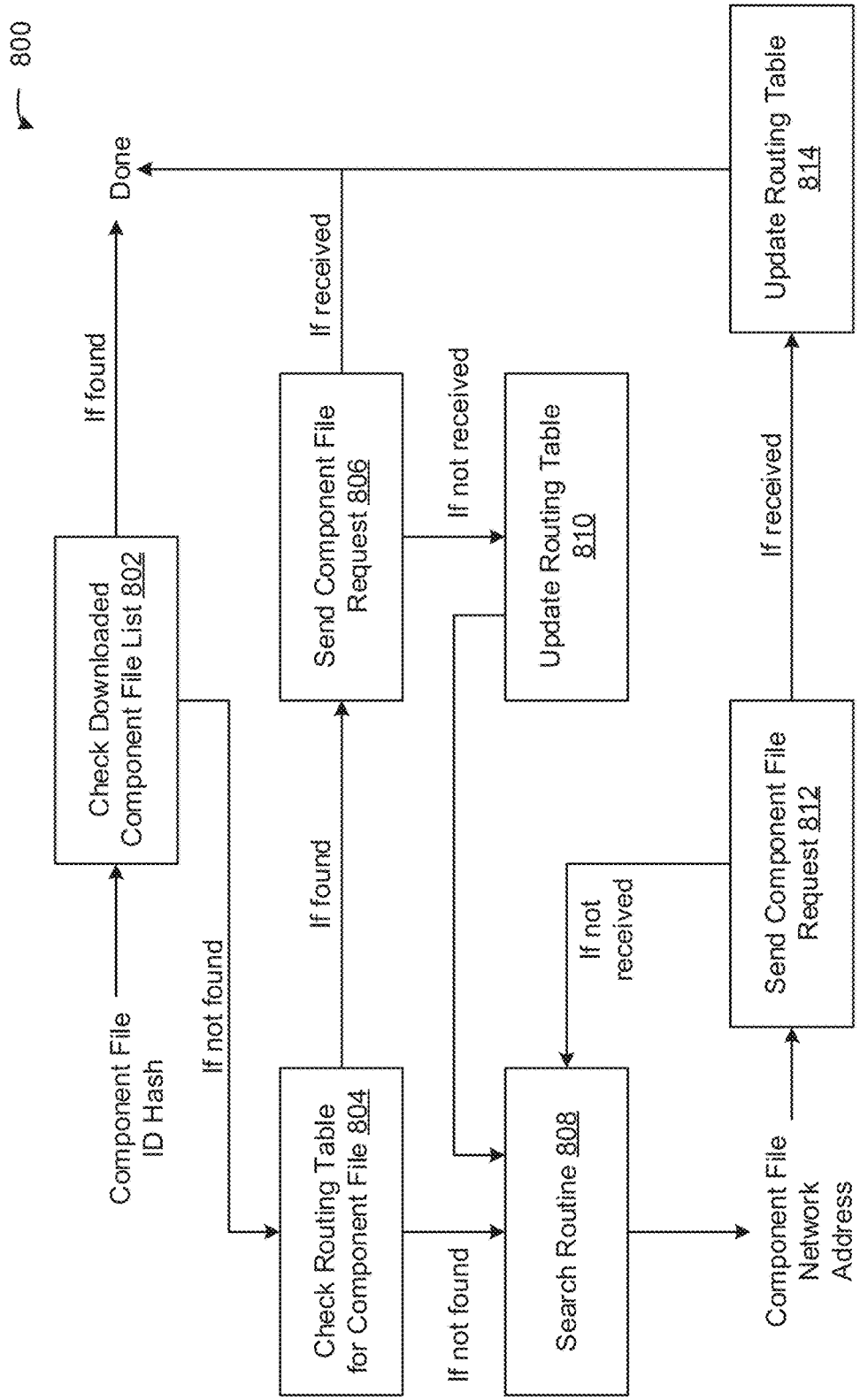
FIG. 8 is a block diagram depicting an example routing table update flow in connection with the data protection system of FIG. 1, according to some arrangements.

Referring now to FIG. 8, a block diagram depicting an example routing table update flow in connection with the data protection system 100 of FIG. 1, according to some arrangements. Component modeler 140 can perform the steps. A specific example of the component file retrieval mechanism is shown in FIG. 6, illustrating the manner in which a node retrieves a specific component file through the use of the FDP. For example, the FDP uses data protection objects stored in the DDS protection network ledger 142 by decrypting the AES key stored therein with the owner's private key, then encrypting the component file map with the AES key. The component file map can contain the ID hashes of the component files and hashes of the data of each component file. Using this map, an FDP component file request is performed for each component file, and each component file is validated to be unmodified from what was originally uploaded based on the data protection object. This can be completed by decrypting the data from the component file, applying a hash function to the component file data, and verifying that it is the same as the data hash in the data protection object component file map, and the data hash in the component file. If a component file is found to have been modified, the routing information for the node which provided the modified module, is added to a blacklist with the component file ID, the node will not accept the component file from the blacklisted node. The node then performs another search routine.

Figure 9:
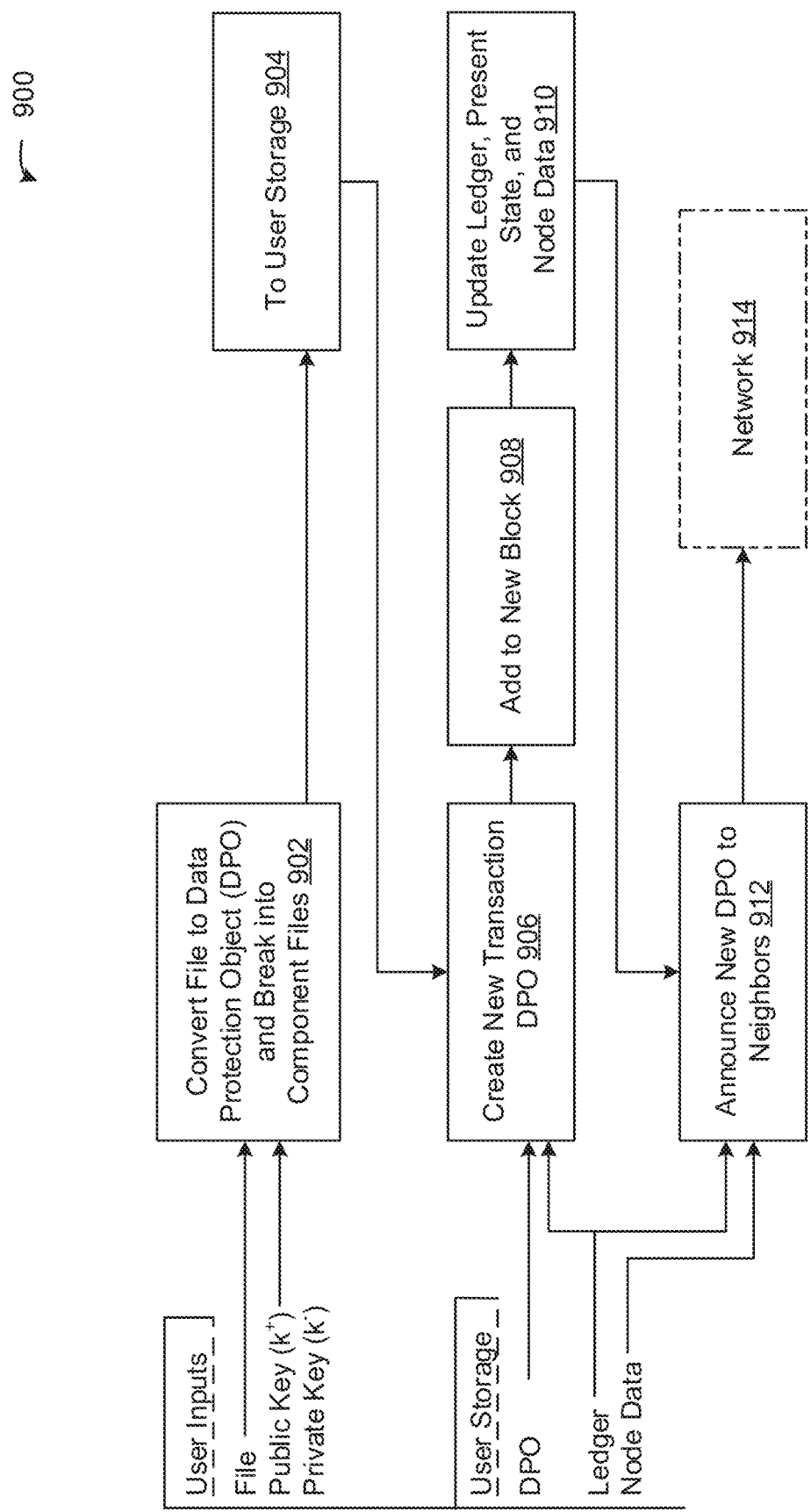
FIG. 9 is a block diagram depicting an example data protection object creation in connection with the data protection system of FIG. 1, according to some arrangements.

Referring now to FIG. 9, a block diagram depicting an example data protection object creation in connection with the data protection system 100 of FIG. 1, according to some arrangements. Component modeler 140 can perform the steps. In particular, FIG. 9 illustrates a method for creating a new block and distributing new ledger data protection objects, in which a new block is created and the ledger data protection objection of this new block is distributed. As shown, the user can input a file, a public key, and private key which can be received by component modeler 140 (e.g., via data acquisition engine 138). At 902, component modeler 140 can convert the file into a data protection object and into a plurality of component files. At 904, the data protection object and the plurality of component files can be stored (e.g., the data protection object in DDS protection network ledger 142 and the plurality of component files in node database 144). Additionally, at 906, 908, and 910 a new transaction data protection object can be created on the DDS protection network ledger 142 where a new block can be mined (or added to) and the DDS protection network ledger 142 including the present state can be updated. Additionally, the new data protection object can be announced to other nodes on the network 914 (including similar features and functionality of DDS protection network 130). In some examples, with respect to step 910, the user's local copy of the DDS protection network ledger 142 is updated with the new data protection object of the transaction. This data protection object contains a copy of the ".filot" file generated in step 902. The data protection object is distributed and open to all users of the blockchain, however only the owner has the ability to reconstruct the file, as the AES256 key which encrypted the component file map, was encrypted with the owner's public key. With respect to step 912, an announcement is sent to all nodes in the user's routing table 146 (the network connection information for each node which they have received a validated component file from or sent to). The nodes receiving the announcement will check if they have the new block, or a different block with a more recent timestamp, if they do not, they will send a request to the announcing user for their DDS protection network ledger 142 up to and including the last block they both share. If the new ledger information is validated by the receiving node, then they too will announce the new data protection object to their address book. This process is repeated until all nodes have an updated and synchronized ledger.

Figure 10:
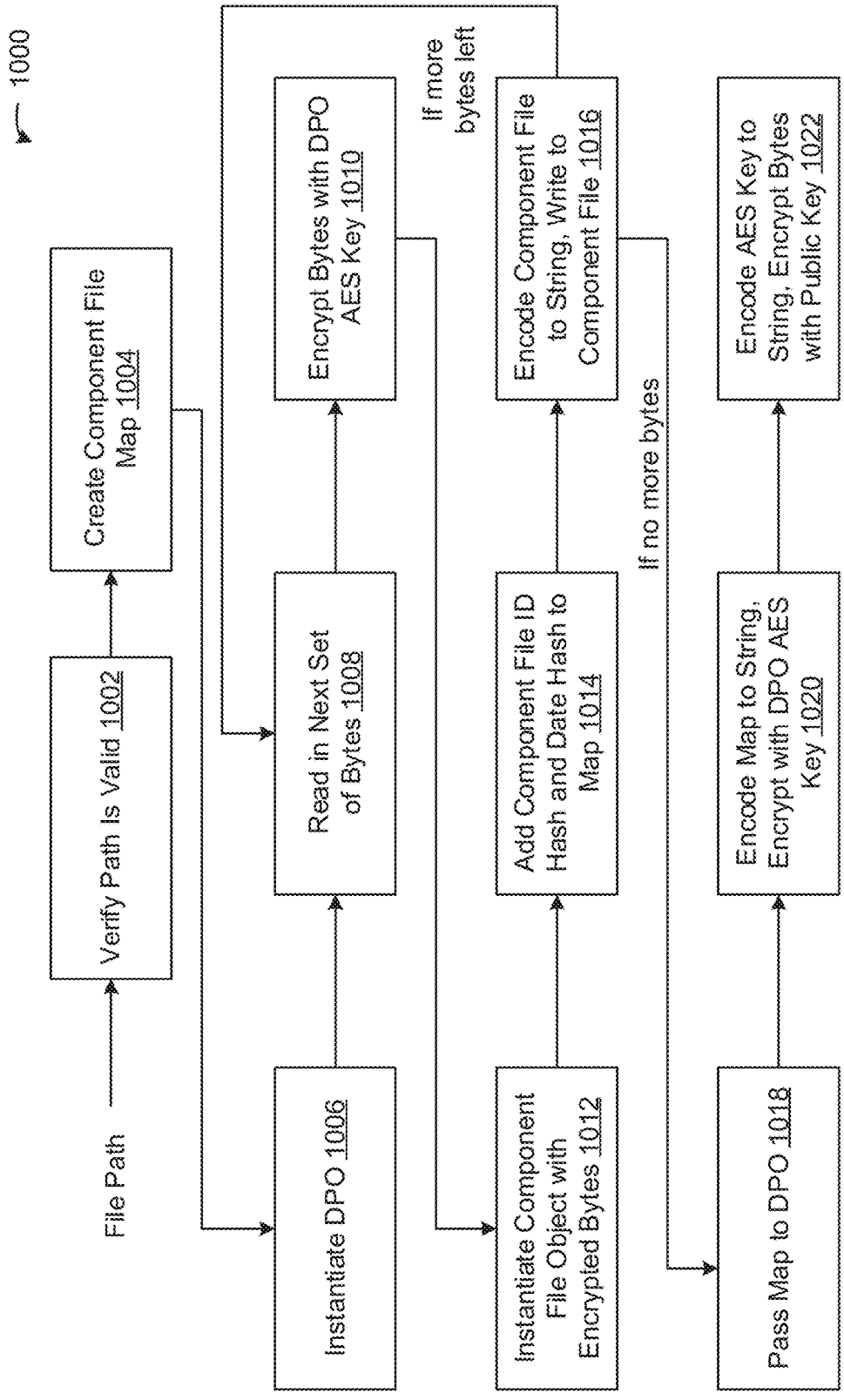
FIG. 10 is a block diagram depicting an example file to component and data protection object flow in connection with the data protection system of FIG. 1, according to some arrangements.

Referring now to FIG. 10, a block diagram depicting an example file to component and data protection object flow in connection with the data protection system of FIG. 1, according to some arrangements. Component modeler 140 can perform the steps. In particular, FIG. 10 illustrates a method for converting a file into a set of component files and a data protection object, for step 902 in FIG. 9. The path given to the file must be confirmed to be valid otherwise the process will end without completing. Then, a map correlates the ID hash of each component file and a hash of the data contained in it (used to validate that a component file has not been modified before retrieval). Additional information regarding the converting process are described in detail with reference to FIGS. 2A-B.

Figure 11:
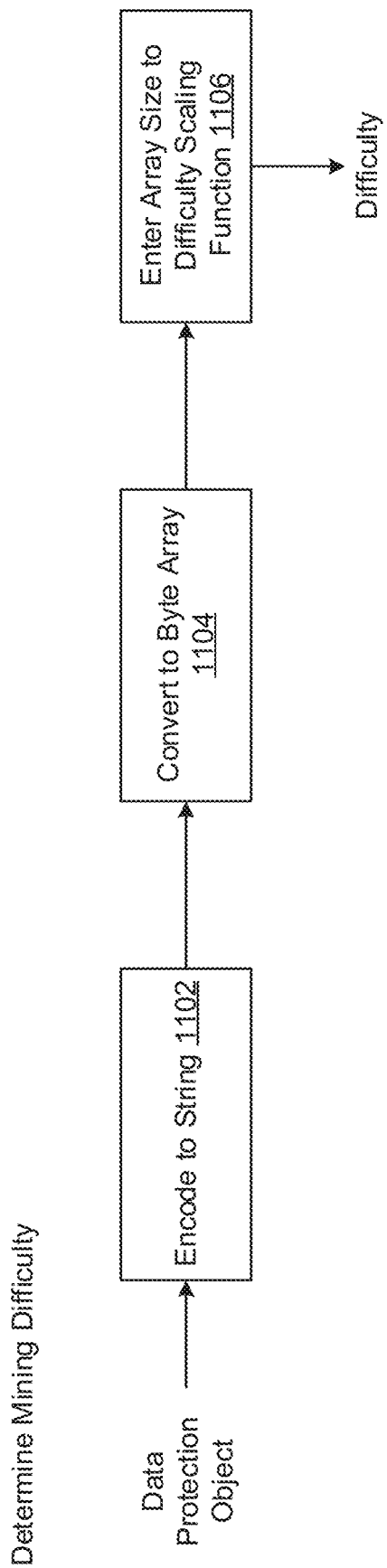
FIG. 11 is a block diagram depicting an example determination of mining difficulty flow in connection with the data protection system of FIG. 1, according to some arrangements.

Referring now to FIG. 11, a block diagram depicting an example determination of mining difficulty flow in connection with the data protection system 100 of FIG. 1, according to some arrangements. Component modeler 140 can perform the steps. Difficulty is calculated (e.g., by component modeler 140) using an algorithm balancing the size of the file and the time since the last user upload as verified by the DDS protection network ledger 142. Specific weighting for those two components may vary. The goal is to discourage abuse of the DDS protection network 130 and to hinder the ability of a malicious user to compromise the utility and security of a DDS protection network 130 by uploading excessively large files or uploading excessively frequently (for example a Denial of Service attack), by causing the computations required to mine a new block for step 908 of FIG. 9. In some arrangements, the difficulty of a given block is determined by the number of component files, the size of a file and the frequency of uploads, and the precise function is based on customer requirement and preference. The method shown in FIG. 11 attempts to mitigate the problem of nodes performing malicious attacks by spamming the network with very large or many small files. At 1102, the data protection object can be encoded to a string and at 1104 converted into a byte array. At 1106 the array size to difficulty scaling function (e.g., find a has below a given target) can be calculated by component modeler 140 to determine difficulty.

Figure 12:
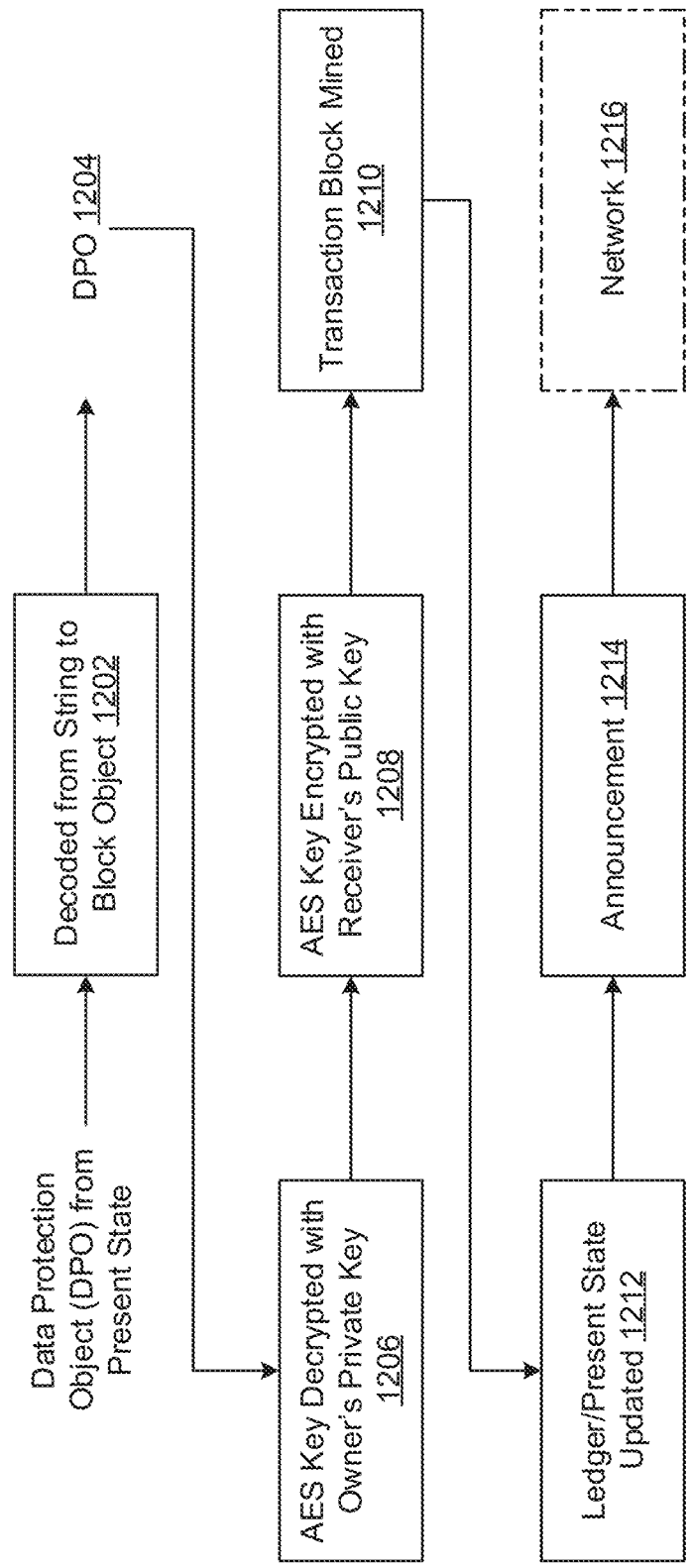
FIG. 12 is a block diagram depicting an example file ownership transfer flow in connection with the data protection system of FIG. 1, according to some arrangements.

FIG. 12 is a block diagram depicting an example file ownership transfer flow in connection with the data protection system of FIG. 1, according to some arrangements. Component modeler 140 can perform the steps. At 1202 and 1204 (e.g., by component modeler 140), the text data for the block containing the data protection object from the present state for the file being transacted is loaded into memory, then decoded from a string into a data protection object. The data protection object of this block is decoded as part of that process, which is then independently loaded into memory. At 1206, the AES key within the data protection object is then decrypted using the old owner's public key and encrypted (at 1208) using the new owner's public key. At 1210, a new transaction containing the modified data protection object is created and added to a new block on the data protection network ledger 142. After which the new block is mined, a new ledger record is generated and the present state is updated (at 1212), and an announcement (at 1214) of this new ledger data protection object is performed. Once the announcement has propagated to the new owner (e.g., via network 1216 or DDS protection network 130), the nodes will have access to the data protection object of the file and will therefore be able to reconstruct and decrypt the file.

Figure 13:
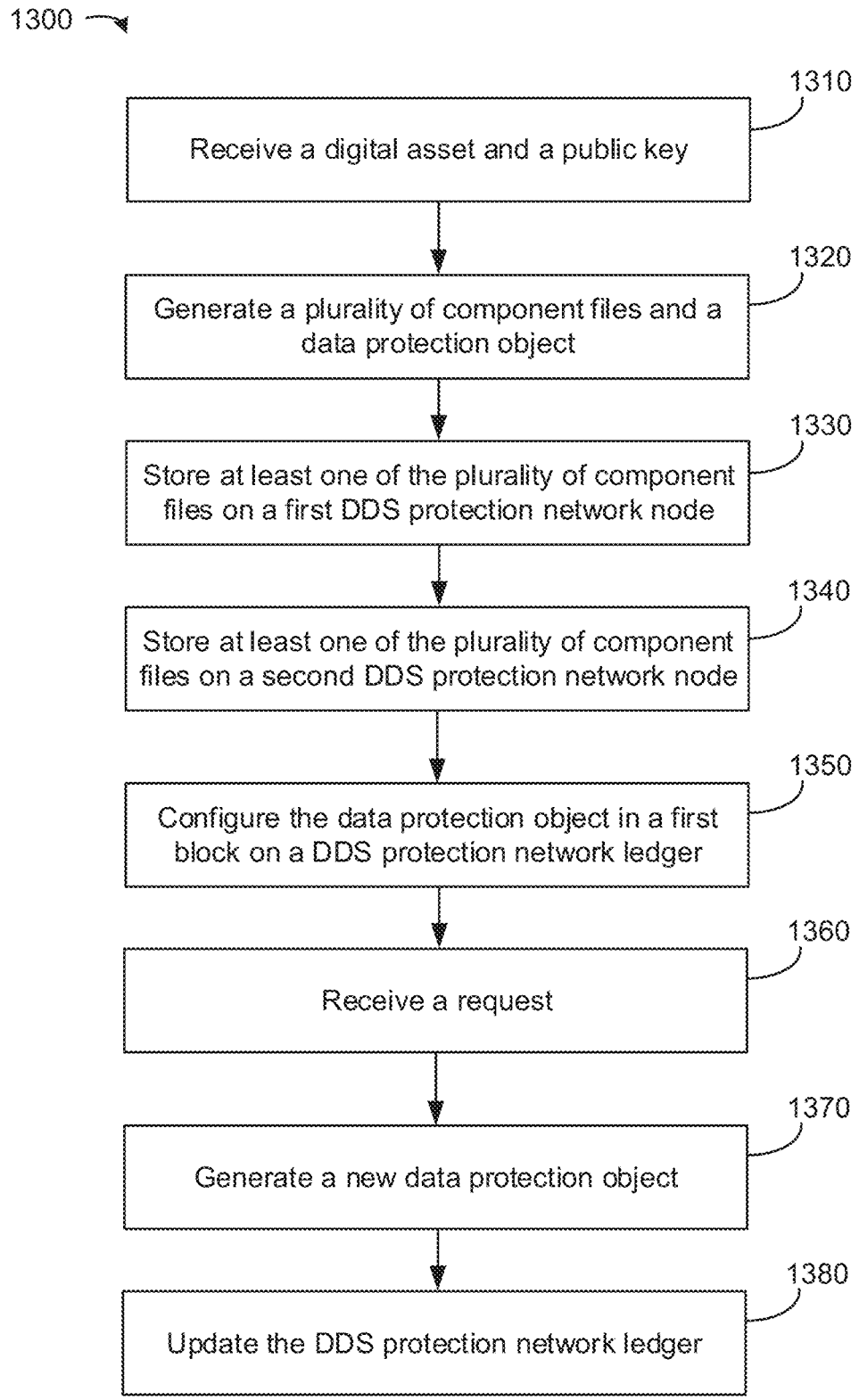
FIG. 13 is a flowchart for a method of data protected that may be implemented or performed by one or more components and/or systems of FIG. 1, according to some arrangements.

Referring now to FIG. 13, a flowchart for a method 1300 of data protected that may be implemented or performed by one or more components and/or systems of FIG. 1 is shown, according to some arrangements. DDS protection network node(s) 132 can be configured to perform method 1300. Further, any computing device described herein can be configured to perform method 1300.

In broad overview of method 1300, at block 1310, the one or more processing circuits (e.g., DDS protection network node 132, user device 160 in FIG. 1) can receive a digital asset and a public key. At block 1320, the one or more processing circuits can generate a plurality of component files and a data protection object (DPO). At block 1330, the one or more processing circuits can store at least one of the plurality of component files on a first DDS protection network node (e.g., 132A). At block 1340, the one or more processing circuits can store at least one of the plurality of component files on a second DDS protection network node (e.g., 132B). At block 1350, the one or more processing circuits can configure the DPO in a first block on a DDS protection network ledger (e.g., 142). At block 1360, the one or more processing circuits can receive a request. At block 1370, the one or more processing circuits can generate a new data protection object. At block 1380, the one or more processing circuits can update the DDS protection network ledger. Additionally, fewer, or different operations may be performed depending on the particular arrangement. In some arrangements, some, or all operations of method 1300 may be performed by one or more processors executing on one or more computing devices, systems, or servers. In various arrangements, each operation may be re-ordered, added, removed, or repeated.

Referring to method 1300 in more detail, at block 1310, the one or more processing circuits (e.g., by at least one of a plurality of DDS protection network nodes 132) can receive a digital asset and a public key of an owner of the digital asset, wherein the digital asset includes a dataset. In some arrangements, the digital asset can be a file, document, or any data that is attempting to be stored on the DDS protection network 130, and the public key can be an AES key or another encryption key.

At block 1320, the one or more processing circuits can generate a plurality of component files and a data protection object based on the dataset. In various arrangements, generating the component files can include creating a plurality of encrypted digital assets based on encrypting each of a plurality of split digital assets of the digital asset. In particular, splitting includes creating a plurality of data subsets of the dataset, and wherein the dataset is a first file size, and wherein each of the plurality of data subsets is a second file size with a buffer, and wherein the second file size without the buffer is equal to the first file size of the dataset. In some arrangements, creating the plurality of encrypted digital assets further includes modifying each of the plurality of split digital assets, wherein modifying includes adding a plurality of encrypted digital asset metadata fields to the plurality of split digital assets. In various arrangements, creating the plurality of encrypted digital assets based on encrypting each of the plurality of split digital assets further includes creating the plurality of split digital assets based on splitting the digital asset, generating a plurality of split digital asset metadata for each of the plurality of split digital assets, and storing the plurality of split digital asset metadata into a corresponding split digital asset.

At block 1330, the one or more processing circuits can store at least one of the plurality of component files on a first DDS protection network node of the plurality of DDS protection network nodes, wherein the first DDS protection network node stores a first data payload including at least a first signature and a first public key. In various arrangements, the component file can be stored in a node database 144 and a routing table 146 can be updated based on the stored component file.

At block 1340, the one or more processing circuits can store at least one of the plurality of component files on a second DDS protection network node of the plurality of DDS protection network nodes, and wherein the second DDS protection network node stores a second data payload include at least a second signature and a second public key. In various arrangements, the component file can be stored in a node database 144 and a routing table 146 can be updated based on the stored component file.

At block 1350, the one or more processing circuits can configure the data protection object in a first block on a DDS protection network ledger. In various arrangements, configuring the data protection object on the DDS protection network ledger further includes generating the first block including the data protection object.

At block 1360, the one or more processing circuits can receive a request associated with the digital asset. In some arrangements, the request is at least one of an exchange request, a transfer request, an update request, or an access request.

At block 1370, the one or more processing circuits can generate a new data protection object associated with the request. In various arrangements, generating (or creating) the data protection object can include generating a plurality of data protection object metadata for the data protection object and storing the plurality of data protection object metadata into the data protection object.

At block 1380, the one or more processing circuits can update the DDS protection network ledger to include the new data protection object. In some arrangements, updating can include, but is not limited to, generating a second block including at least the new data protection object, creating a sub-chain within the DDS protection network ledger, wherein the sub-chain includes at least one retroactive data protection object traceable to the new data protection object, and updating a present state of the DDS protection network ledger. In various arrangements, updating the DDS protection network ledger is further based on receiving a predetermined number of requests, and wherein updating the DDS protection network ledger to include the new data protection object further includes updating the DDS protection network ledger to include additional data protection objects associated with the predetermined number of requests. Additionally, the data protection object can be at least one retroactive data protection object in response to updating the DDS protection network ledger to include the new data protection object. In particular, the at least one retroactive data protection object is traceable to the new data protection object based on each of a plurality of data protection objects in the sub-chain referencing a next data protection object and a previous data protection object, and wherein the new data protection object is associated with the present state.

In some arrangements, the plurality of DDS protection network nodes can further execute a component file swap between at least two nodes of the plurality of DDS protection network nodes, wherein the component file swap includes transmitting, by a third DDS protection network node to a fourth DDS protection network node, a third data payload including a third signature and a third public key. Further, the component file swap includes receiving, by the third DDS protection network node from the fourth DDS protection network node, a fourth data payload including a fourth signature and a fourth public key. Further, the component file swap includes requesting, by the third DDS protection network node from the fourth DDS protection network node, a first component file. Further, the component file swap includes receiving, by the third DDS protection network node from the fourth DDS protection network node, a fifth data payload including a fifth signature and a fifth public key associated with the first component file.

In various arrangements, the plurality of DDS protection network nodes further execute a component file request between at least two nodes of the plurality of DDS protection network nodes, wherein the component file request includes transmitting, by a third DDS protection network node to a fourth DDS protection network node, a third data payload including a third signature, a third public key, and an ID hash for a first component file. Further, the component file request includes receiving, by the third DDS protection network node from the fourth DDS protection network node, a fourth data payload including a fourth signature, a fourth public key, and the ID hash for the first component file. Further, the component file swap includes establishing, by the third DDS protection network node utilizing a transmission control protocol (TCP) handshake, a TCP connection with the fourth DDS protection network node. Further, the component file swap includes receiving, by the third DDS protection network node from the fourth DDS protection network node via the TCP connection, the first component file. Further, the component file swap includes storing, by the third DDS protection network node, the first component file.

In some arrangements, the file can be reconstructed by searching, by the at least one of the plurality of DDS protection network nodes, the DDS protection network ledger for the data protection object associated with the digital asset. File reconstruction can further include decrypting, by the at least one of the plurality of DDS protection network nodes, the data protection object. File reconstruction can further include executing, by the at least one of the plurality of DDS protection network nodes, a search routine for each of the plurality of component files. File reconstruction can further include reconstructing, by the at least one of the plurality of DDS protection network nodes, the digital asset based on interpretating the plurality of component files based on the data protection object. File reconstruction can further include transmitting, by the at least one of the plurality of DDS protection network nodes, the digital asset to a user device. Once the digital asset is received it can be decrypted based on a private key (or public key) and a hash or buffer.

Figure 14:
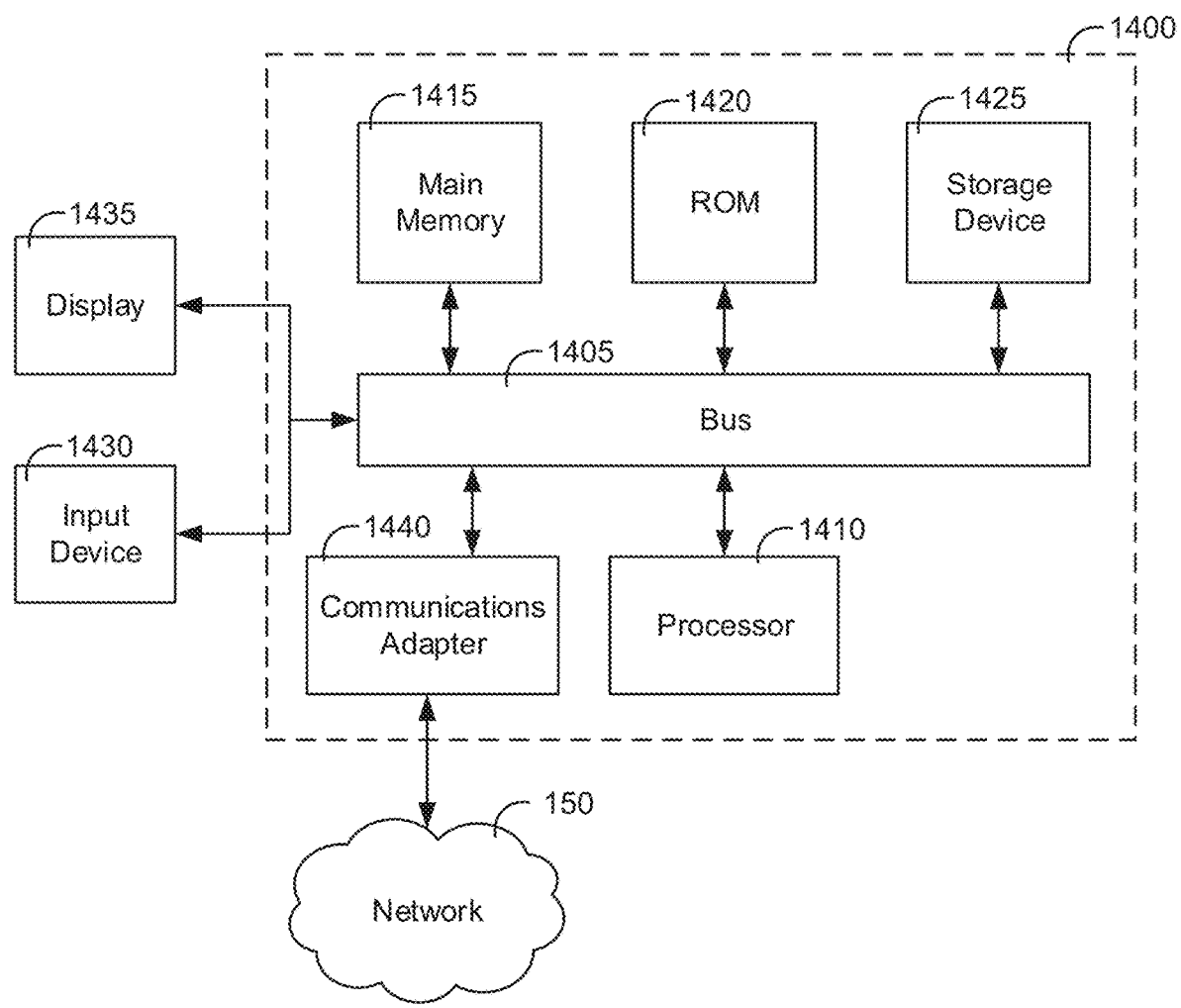
FIG. 14 is a block diagram illustrating an example computing system suitable for use in the various arrangements described herein.

Referring now to FIG. 14, a depiction of a computer system 1400 is shown. The computer system 1400 that can be used, for example, to implement a data protection system 100, DDS protection network 130, DDS protection nodes 132, user devices 160, and/or various other example systems described in the present disclosure. The computing system 1400 includes a bus 1405 or other communication component for communicating information and a processor 1410 coupled to the bus 1405 for processing information. The computing system 1400 also includes main memory 1415, such as a random-access memory (RAM) or other dynamic storage device, coupled to the bus 1405 for storing information, and instructions to be executed by the processor 1410. Main memory 1415 can also be used for storing position information, temporary variables, or other intermediate information during execution of instructions by the processor 1410. The computing system 1400 may further include a read only memory (ROM) 1420 or other static storage device coupled to the bus 1405 for storing static information and instructions for the processor 1410. A storage device 1425, such as a solid-state device, magnetic disk, or optical disk, is coupled to the bus 1405 for persistently storing information and instructions.

The computing system 1400 may be coupled via the bus 1405 to a display 1435, such as a liquid crystal display, or active matrix display, for displaying information to a user. An input device 1430, such as a keyboard including alphanumeric and other keys, may be coupled to the bus 1405 for communicating information, and command selections to the processor 1410. In another arrangement, the input device 1430 has a touch screen display 1435. The input device 1430 can include any type of biometric sensor, a cursor control, such as a mouse, a trackball, or cursor direction keys, for communicating direction information and command selections to the processor 1410 and for controlling cursor movement on the display 1435.

In some arrangements, the computing system 1400 may include a communications adapter 1440, such as a networking adapter. Communications adapter 1440 may be coupled to bus 1405 and may be configured to enable communications with a computing or communications network 130 and/or other computing systems. In various illustrative arrangements, any type of networking configuration may be achieved using communications adapter 1440, such as wired (e.g., via Ethernet), wireless (e.g., via Wi-Fi or Bluetooth), satellite (e.g., via GPS) pre-configured, ad-hoc, LAN, and/or WAN.

According to various arrangements, the processes that effectuate illustrative arrangements that are described herein can be achieved by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement may also be employed to execute the instructions contained in main memory 1415. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 14, arrangements of the subject matter and the functional operations described in this specification can be carried out using other types of digital electronic circuitry, or in computer software (e.g., application, blockchain, or distributed ledger technology (DLT)) embodied on a tangible medium, firmware, or hardware, including the structures disclosed in this specification and their structural equivalents, or in any combination of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 14 as singular, stand-alone devices, one of ordinary skill in the art will appreciate that, in some arrangements, the computing system 1400 may include virtualized systems and/or system resources. For example, in some arrangements, the computing system 1400 may be a virtual switch, virtual router, virtual host, virtual server. In various arrangements, computing system 1400 may share physical storage, hardware, and other resources with other virtual machines. In some arrangements, virtual resources of the DDS protection network 130 and network 150 of FIG. 1 may include cloud computing resources such that a virtual resource may rely on distributed processing across more than one physical processor, distributed memory, etc.

Figure 15:
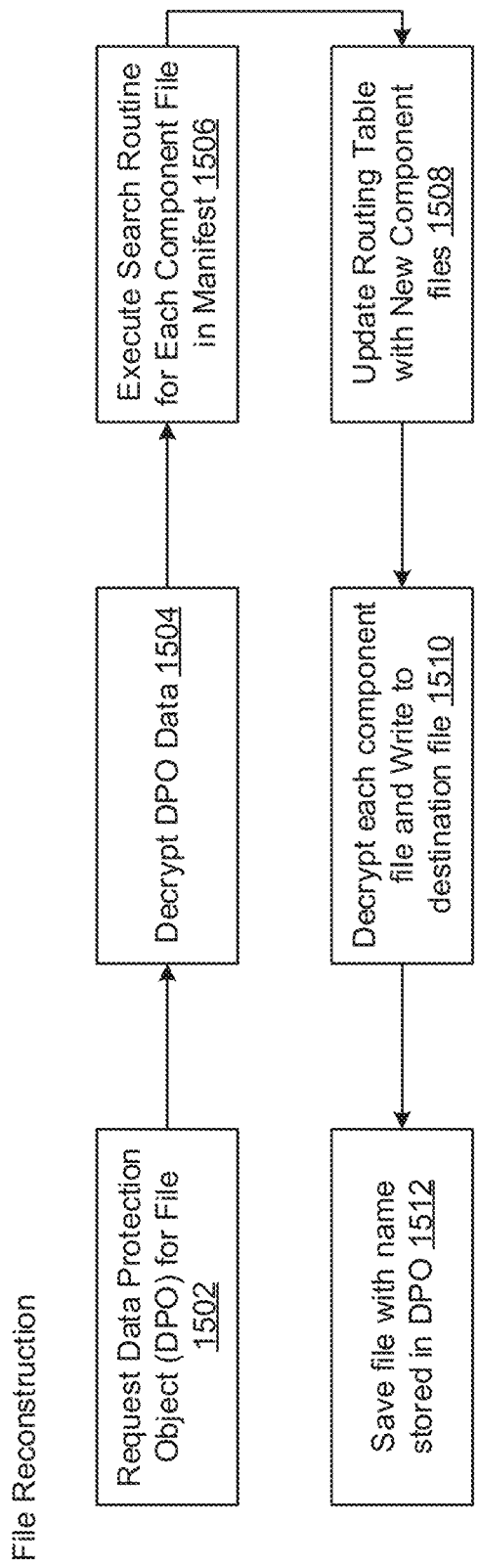
FIG. 15 is a block diagram depicting an example file reconstruction flow in connection with the data protection system of FIG. 1, according to some arrangements.

Referring now to FIG. 15, a block diagram depicting an example file reconstruction flow in connection with the data protection system 100 of FIG. 1, according to some arrangements. Component modeler 140 can perform the steps. At 1502, a request for a data protection object (DPO) associated with the file can sent, and the DPO can be received and decrypted at 1504. At 1506, a search routine can be executed to locate each component file of the plurality component files of the digital asset (sometimes referred to herein as "a manifest", i.e., a manifest of component files) and the touting table (e.g., 146) can be updated with the new component files at 1508. At 1510, each component file can be decrypted based on the data protection object metadata (e.g., public key, private key, or hash) and write it a new destination file, and the new file can then be saved and/or sent requesting entity (e.g., user device 160).

Figure 16:
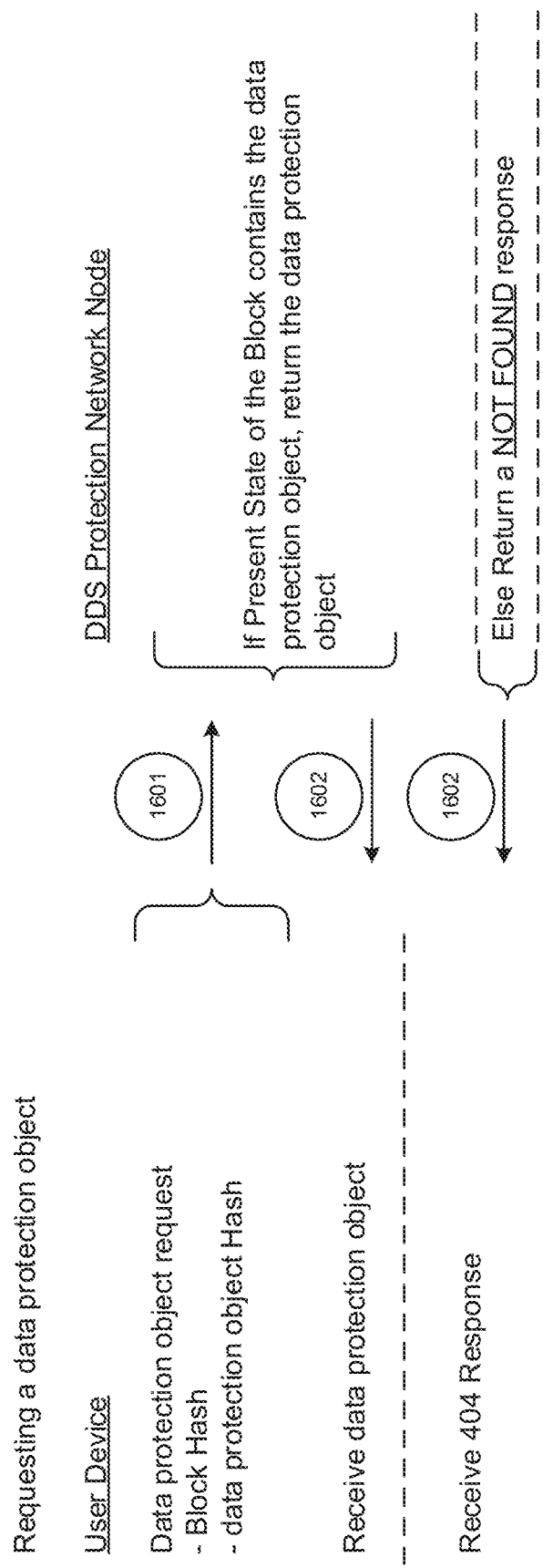
FIG. 16 is a block diagram depicting an example requesting a data protection object flow in connection with the data protection system of FIG. 1, according to some arrangements.

Referring now to FIG. 16, a block diagram depicting an example requesting a data protection object flow in connection with the data protection system 100 of FIG. 1, according to some arrangements. Component modeler 140 can perform the steps. Requesting a data protection object (DPO) can include making a request (e.g., by user device 160) that includes the block hash and data protection object hash (at 1601). In response, the DDS protection network node (e.g., 132) can determine if the present state of the block contains the DPO and return the DPO if it does (at 1602), if not return a not found response (at 1602). For example, if Block 2, Date Protection Object 5 (as shown with reference to FIG. 2A) is requested the component modeler 140 can return a "404: Record Not Found in Present State," which would indicate the data protection object is not in the present state. In another example, if Block 2, Date Protection Object 6 (as shown with reference to FIG. 2A) is requested the component modeler 140 can return the data protection object to the requester (e.g., user device 160). However, the data protection object can also be decrypted using the users private key such that a hacker or a fraudster cannot "unlock" the data protection object as it will fail to decrypt the data if another private key is used.

Figure 17:
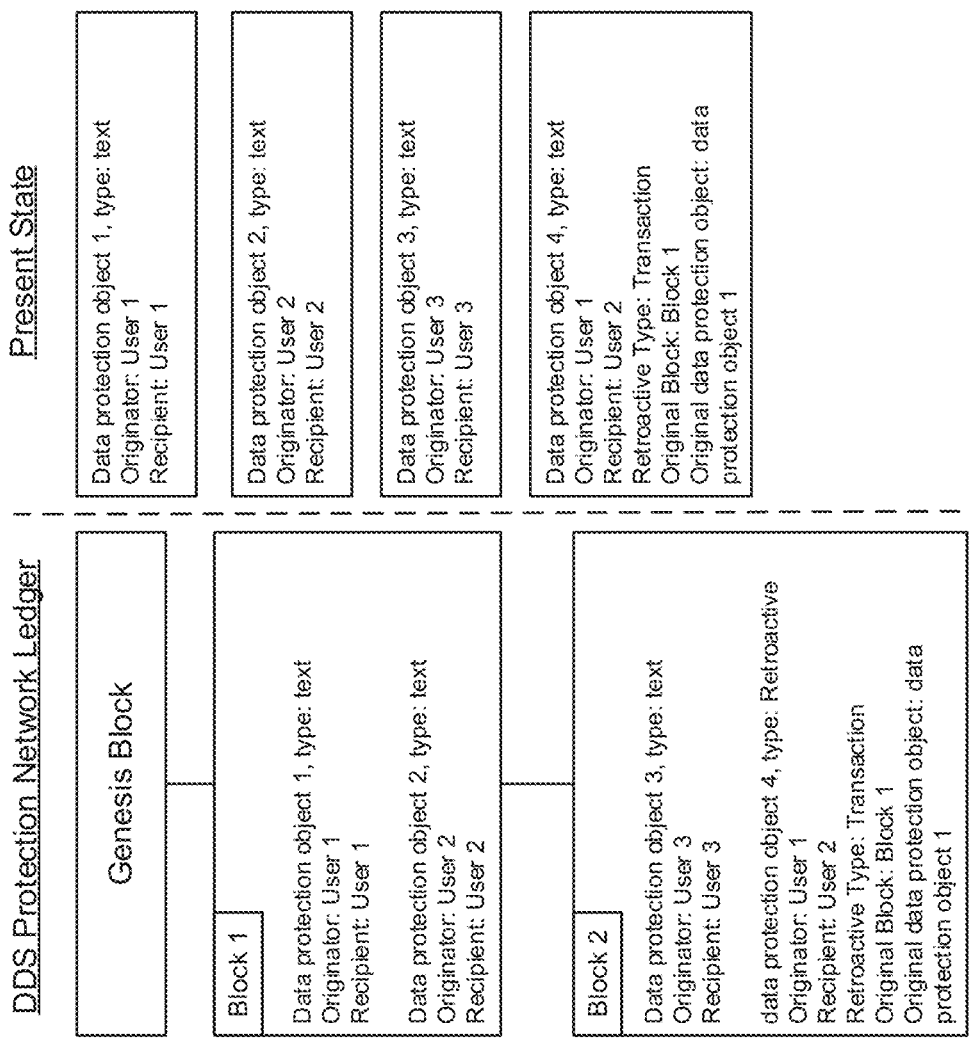
FIG. 17 is a block diagram depicting an example of a DDS protection network ledger and a present state in connection with the FDP of FIGS. 1, 2A, and 2B, according to some arrangements.

FIG. 17 is a block diagram depicting an example of a DDS protection network ledger and a present state in connection with the FDP of FIGS. 1, 2A, and 2B, according to some arrangements. As shown, the DDS protection network ledger 142 can include a plurality of blocks with a plurality of metadata in each block. For example, Block 1 contains two data protection objects (DPOs) with metadata about each DPO. Also shown, the present state can be kept by the DDS protection ledger 142 for each data protection object. Furthermore, sub-chains can be created (not shown). Additional details regarding the DDS protection network ledger and present state are described in detail with reference to FIGS. 1, 2A, and 2B.

While this specification contains many specific implementation details and/or arrangement details, these should not be construed as limitations on the scope of any arrangements or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Additionally, features described with respect to particular headings may be utilized with respect to and/or in combination with illustrative arrangement described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements, and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement," or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, and sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, and XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, or script components), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A method, comprising:
   identifying, by one or more processing circuits, a request associated with a digital asset;
   generating, by the one or more processing circuits, a new data object associated with the request; and
   updating, by the one or more processing circuits, a network ledger to comprise the new data object, wherein updating comprises:

generating a block comprising at least the new data object;

configuring the new data object in the block;

generating a chain within the network ledger, wherein the chain comprises at least one retroactive data object traceable to the new data object; and updating a present state of the network ledger.

2. The method of claim 1, wherein the one or more processing circuits further execute a component data structure swap between at least two nodes of a plurality of network nodes of the network ledger, wherein the component data structure swap comprises:

transmitting, by the one or more processing circuits, a data payload comprising a signature and a cryptographic output of a cryptographic function;

receiving, by the one or more processing circuits, a second data payload comprising a second signature and a second cryptographic output of a second cryptographic function;

requesting, by the one or more processing circuits, a first component data structure; and receiving, by the one or more processing circuits, a third data payload comprising a third signature and a third cryptographic output of a third cryptographic function associated with the first component data structure.

3. The method of claim 1, wherein the one or more processing circuits further execute a component data structure request between at least two nodes of a plurality of network nodes of the network ledger, wherein the component data structure request comprises:

transmitting, by the one or more processing circuits, a data payload comprising a signature, a cryptographic output, and an ID hash for a component data structure;

receiving, by the one or more processing circuits, a second data payload comprising a second signature, a second cryptographic output, and the ID hash for a first component data structure;

establishing, by the one or more processing circuits utilizing a communication protocol, a connection with another network node;

receiving, by the one or more processing circuits via the connection, the first component data structure; and storing, by the one or more processing circuits, the first component data structure.

4. The method of claim 1, further comprising:

searching, by the one or more processing circuits, the network ledger for the new data object associated with the digital asset;

decrypting, by the one or more processing circuits, a data protection object;

executing, by the one or more processing circuits, a search routine for at least one of a plurality of data structures;

reconstructing, by the one or more processing circuits, the digital asset based on interpretating the plurality of data structures corresponding with the new data object; and transmitting, by the one or more processing circuits, the digital asset to a user device.

5. The method of claim 1, wherein generating the new data object further comprises:

generating, by the one or more processing circuits, a plurality of data object metadata for the new data object; and storing, by the one or more processing circuits, the plurality of data object metadata in the new data object.

6. The method of claim 1, wherein the request is at least one of an exchange request, a transfer request, an update request, or an access request.

7. The method of claim 1, further comprising:

generating, by the one or more processing circuits, a plurality of data structures by generating a plurality of encrypted digital assets based on encrypting at least one of a plurality of split digital assets of the digital asset.

8. The method of claim 7, where splitting comprises generating a plurality of data subsets of a dataset, and wherein the dataset is a first data structure size, and wherein at least one of the plurality of data subsets is a second data structure size with a buffer, and wherein the second data structure size without the buffer is equal to the first data structure size of the dataset.

9. The method of claim 7, wherein generating the plurality of encrypted digital assets further comprises updating at least one of the plurality of split digital assets, wherein updating comprises adding a plurality of encrypted digital asset metadata fields to the plurality of split digital assets.

10. The method of claim 7, wherein generating the plurality of encrypted digital assets based on encrypting at least one of the plurality of split digital assets further comprises:

generating, by the one or more processing circuits, the plurality of split digital assets based on splitting the digital asset;

generating, by the one or more processing circuits, a plurality of split digital asset metadata for at least one of the plurality of split digital assets; and storing, by the one or more processing circuits, the plurality of split digital asset metadata into a corresponding split digital asset.

11. The method of claim 1, wherein updating the network ledger is further based on receiving a predetermined number of requests, and wherein updating the network ledger to comprise the new data object further comprising updating the network ledger to comprise at least one additional data object associated with the predetermined number of requests.

12. The method of claim 1, wherein the new data object is the at least one retroactive data object in response to updating the network ledger to include a second data object.

13. The method of claim 12, wherein the at least one retroactive data object is traceable to the new data object based on at least one of a plurality of data objects in the chain referencing a next data object and a previous data object, and wherein the new data object is associated with the present state.

14. A system, comprising:

at least one processing circuit configured to:

identify a request associated with a digital asset;

generate a new data object associated with the request; and update a network ledger to comprise the new data object, wherein updating comprises:

generating a block comprising at least the new data object;

configuring the new data object in the block;

generating a chain within the network ledger, wherein the chain comprises at least one retroactive data object traceable to the new data object; and updating a present state of the network ledger.

15. The system of claim 14, wherein the at least one processing circuit further execute a component data structure swap between at least two nodes of a plurality of network nodes of the network ledger, wherein the component data structure swap comprises:

transmitting a data payload comprising a signature and a cryptographic output of a cryptographic function;

receiving a second data payload comprising a second signature and a second cryptographic output of a second cryptographic function;

requesting a first component data structure; and receiving a third data payload comprising a third signature and a third cryptographic output of a third cryptographic function associated with the first component data structure.

16. The system of claim 14, wherein the at least one processing circuit further execute a component data structure request between at least two nodes of a plurality of network nodes of the network ledger, wherein the component data structure request comprises:

transmitting a data payload comprising a signature, a cryptographic output, and an ID hash for a component data structure;

receiving a second data payload comprising a second signature, a second cryptographic output, and the ID hash for a first component data structure;

establishing, utilizing a communication protocol, a connection with another network node;

receiving, via the connection, the first component data structure; and storing the first component data structure.

17. The system of claim 14, wherein the at least one processing circuit is further configured to:

search the network ledger for the new data object associated with the digital asset;

decrypt a data protection object;

execute a search routine for at least one of a plurality of data structures;

reconstruct the digital asset based on interpretating the plurality of data structures corresponding with the new data object; and transmit the digital asset to a user device.

18. The system of claim 14, wherein generating the new data object further comprises:

generating a plurality of data object metadata for the new data object; and storing the plurality of data object metadata in the new data object.

19. The system of claim 14, wherein the request is at least one of an exchange request, a transfer request, an update request, or an access request.

20. One or more non-transitory computer-readable storage media having instructions stored thereon that, when executed by a plurality of processing circuits, cause the plurality of processing circuits to:

identify a request associated with a digital asset;

generate a new data object associated with the request; and update a network ledger to comprise the new data object, wherein updating comprises:

generating a block comprising at least the new data object;

configuring the new data object in the block;

generating a chain within the network ledger, wherein the chain comprises at least one retroactive data object traceable to the new data object; and updating a present state of the network ledger.

* * * * *